United States Patent [19]

Miller et al.

[11] 4,037,751

[45] July 26, 1977

[54] INSULATION SYSTEM

[75] Inventors: Robert C. Miller, Encino, Calif.; Harold E. Lemont, Arlington, Tex.

[73] Assignee: Summa Corporation, Las Vegas, Nev.

[21] Appl. No.: 562,765

[22] Filed: Mar. 27, 1975

Related U.S. Application Data

[63] Continuation-in-part of Ser. No. 352,218, April 18, 1973, abandoned, which is a continuation-in-part of Ser. No. 272,468, July 17, 1972.

[51] Int. Cl.$^2$ .......................... E04B 1/62; E04B 2/30; E04B 2/34
[52] U.S. Cl. ................................. 220/9 R; 428/593; 428/594; 52/404; 60/904; 138/148; 165/136; 165/138; 244/17.11
[58] Field of Search ................. 29/183, 183.5, 191.4, 29/191.6; 165/138, 136; 55/526; 250/515; 220/9 R; 138/148; 52/404; 244/17.11; 60/95

[56] References Cited

U.S. PATENT DOCUMENTS

| | | | |
|---|---|---|---|
| 2,303,247 | 11/1942 | Woods | 165/135 |
| 2,514,170 | 7/1950 | Walter et al. | 220/9 |
| 2,540,331 | 2/1951 | Hlavaty | 165/136 X |
| 3,003,599 | 10/1961 | Rubissow | 428/179 |
| 3,007,596 | 11/1961 | Matsch | 165/136 UX |
| 3,013,641 | 12/1961 | Compton | 165/136 X |
| 3,150,793 | 9/1964 | Messer | 220/9 R X |
| 3,236,300 | 2/1966 | Chave et al. | 165/136 |
| 3,282,011 | 11/1966 | Messerole et al. | 52/573 |
| 3,430,405 | 3/1969 | Alder et al. | 52/573 |
| 3,556,735 | 1/1971 | Epelman | 55/526 X |
| 3,770,557 | 11/1973 | Habeeb et al. | 165/136 X |
| 3,948,295 | 4/1976 | Lemont et al. | 138/147 |

*Primary Examiner*—Arthur J. Steiner
*Attorney, Agent, or Firm*—George F. Smyth

[57] ABSTRACT

An all metal, low conductivity, high performance and relatively lightweight, composite structure, in the form of an insulation blanket is operably disposed to be exposed to a high temperature zone, e.g., a high temperature fluid, or on a supporting surface exposed to high temperature. The composite includes two metal skin members spaced from each other by a metallic member functioning as a spacing member. The spacing member is preferably deformed to contact the spaced skin sheets at spaced positions, the space between the skin sheets forming a fluid space which defines a zone of substantially reduced heat transfer by convection. When deformed, the spacing member, or an array of spacers, also provides an elongated path for conduction of heat, and defines a plurality of cavities of limited volume forming stagnant gas pockets. The skin sheets may be perforated to vent the cavities and to provide expansion space for absorbing thermal growth by the metal components of the composite. The spacing member also operates as a shield against the transfer of heat by radiation with the effect that the composite has a heat transfer coefficient substantially dictated by the thermal conductivity of the fluid in the space between the skin members. Use of metal components, principally of commercially available materials, permits fabrication of composites having various shapes and structural strengths, e.g., vibration, compaction, fatigue, etc., good chemical stability and easily repaired. Various different forms and alternate arrangements are described.

35 Claims, 41 Drawing Figures

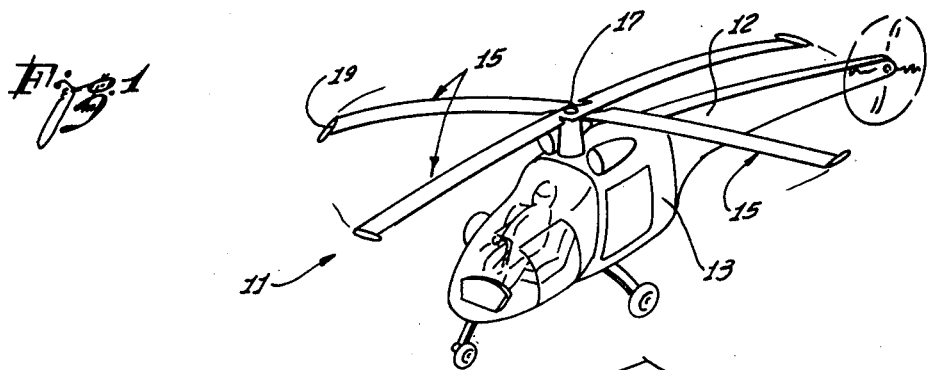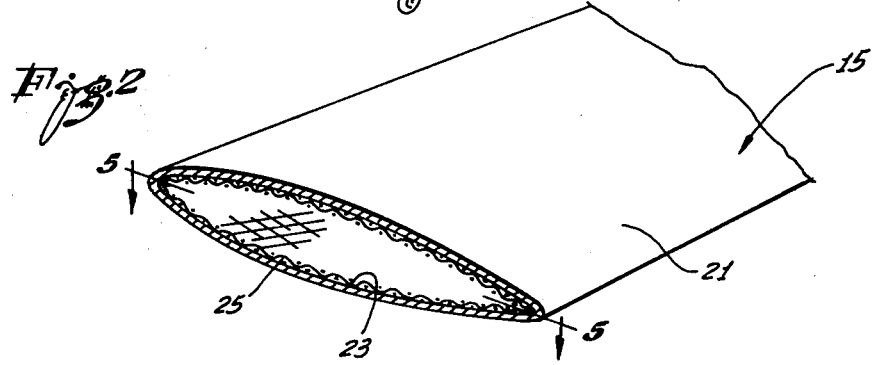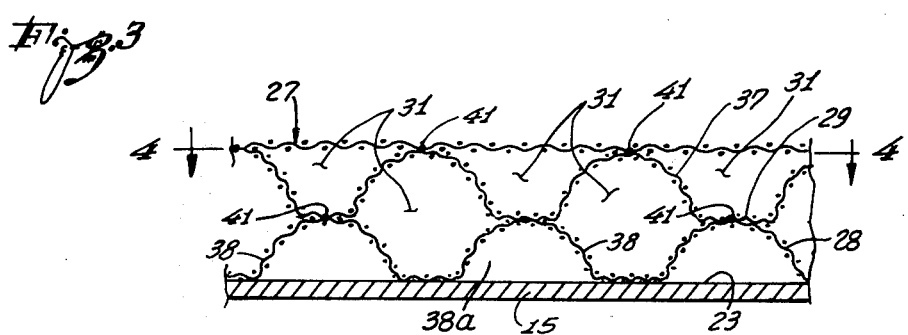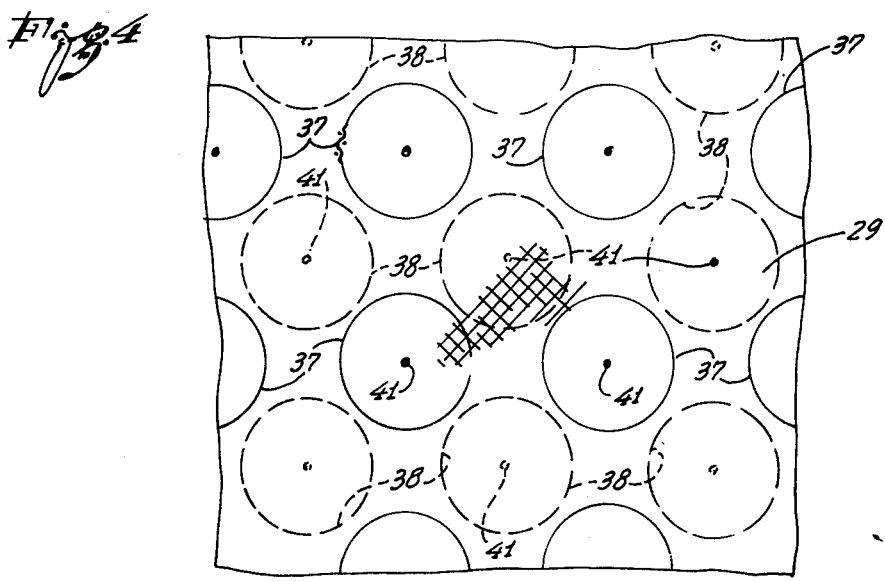

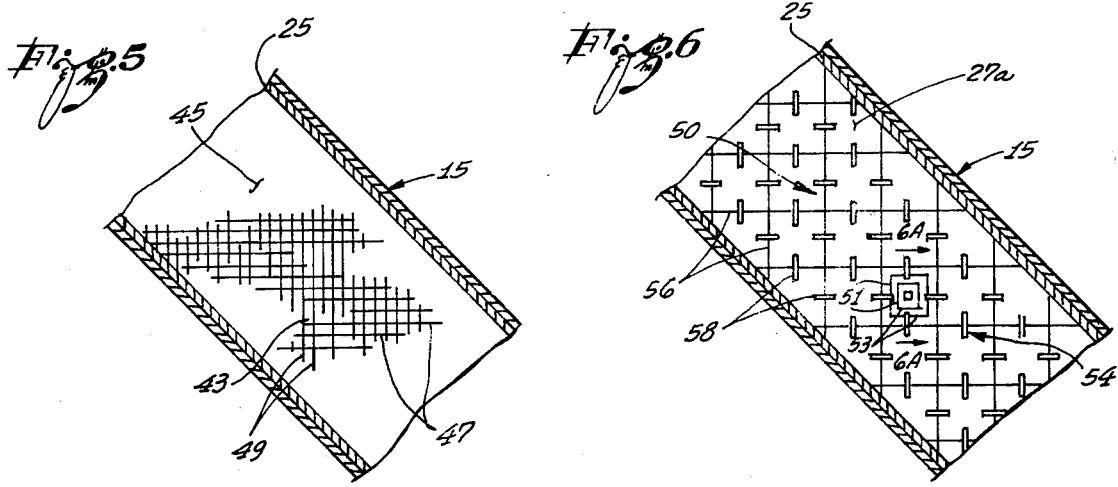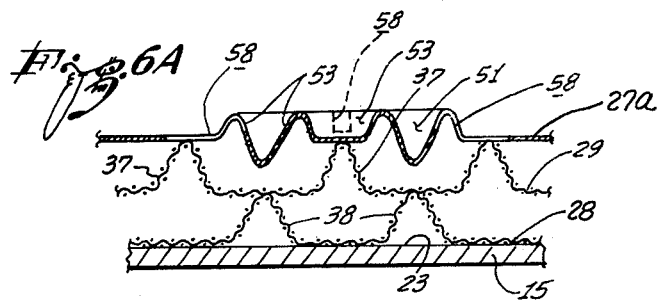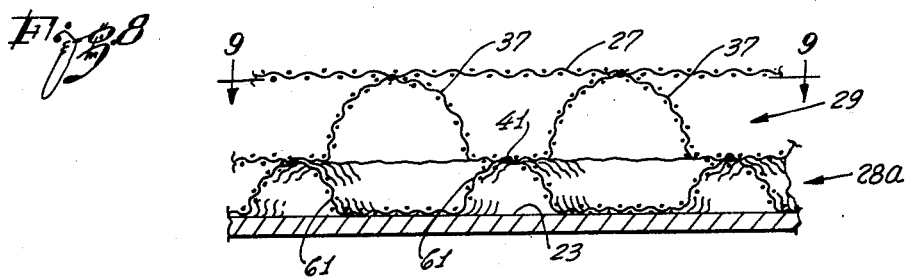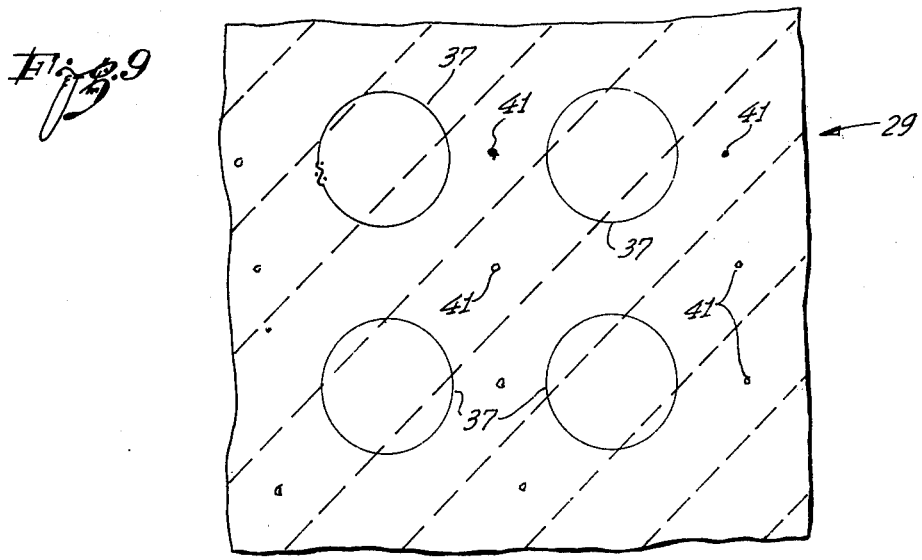

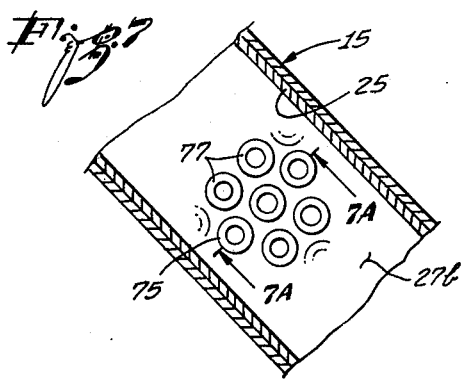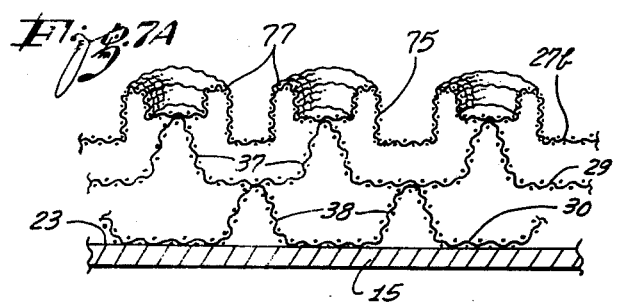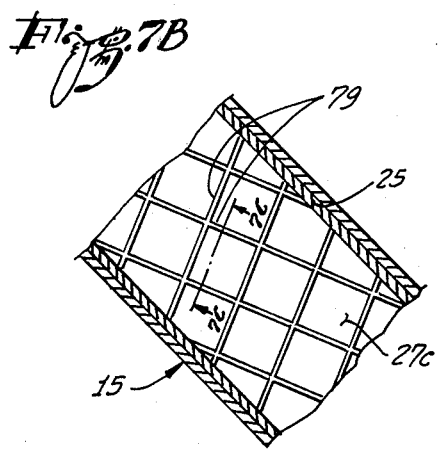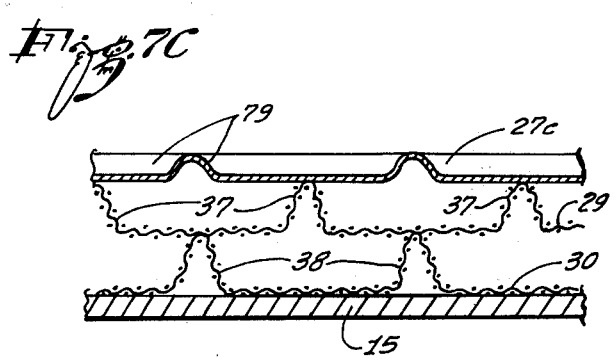

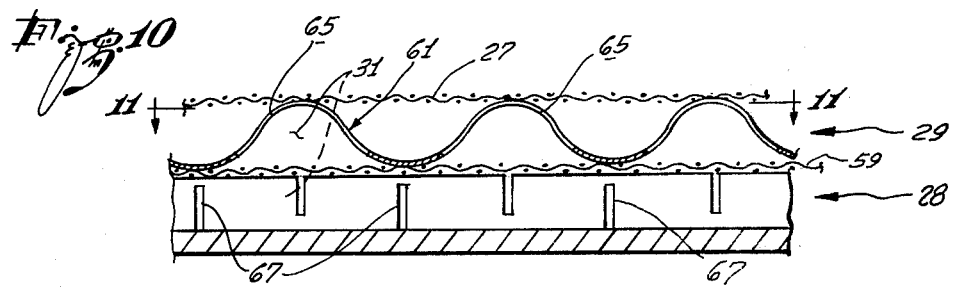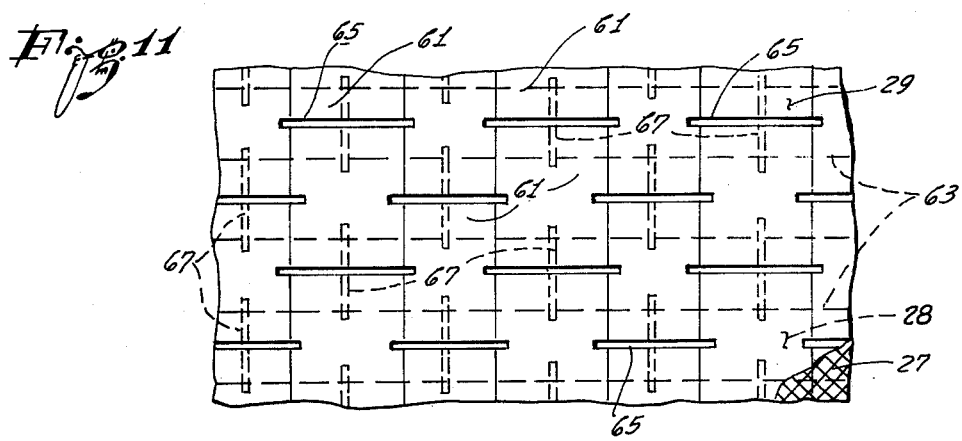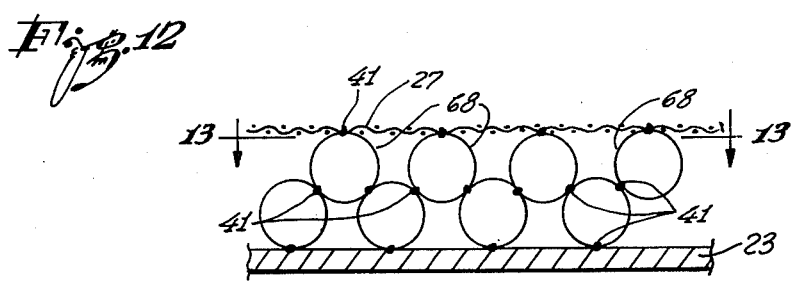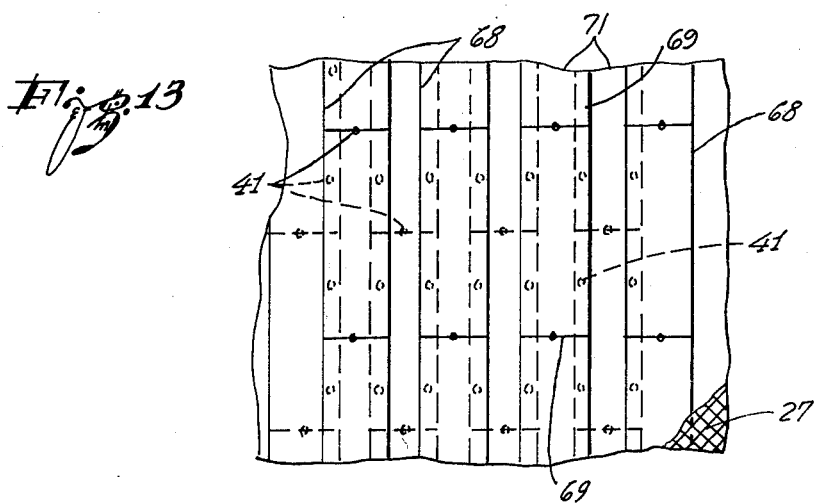

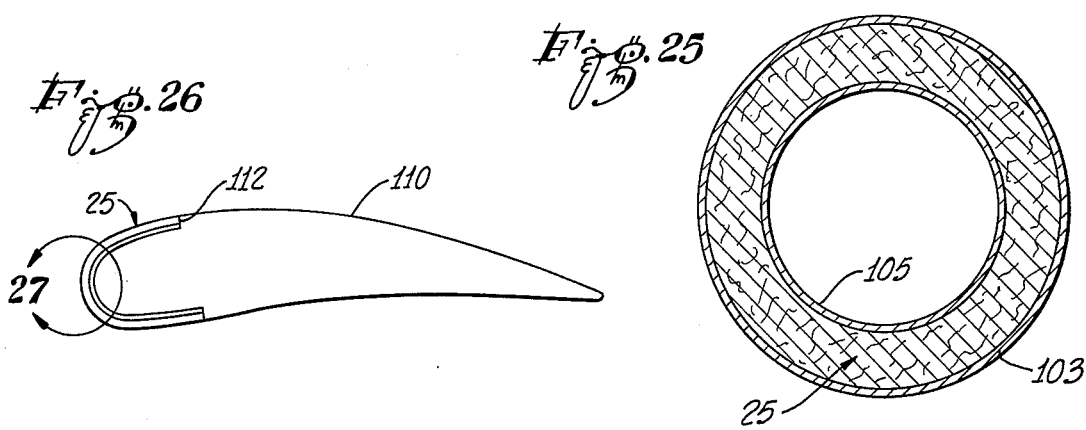
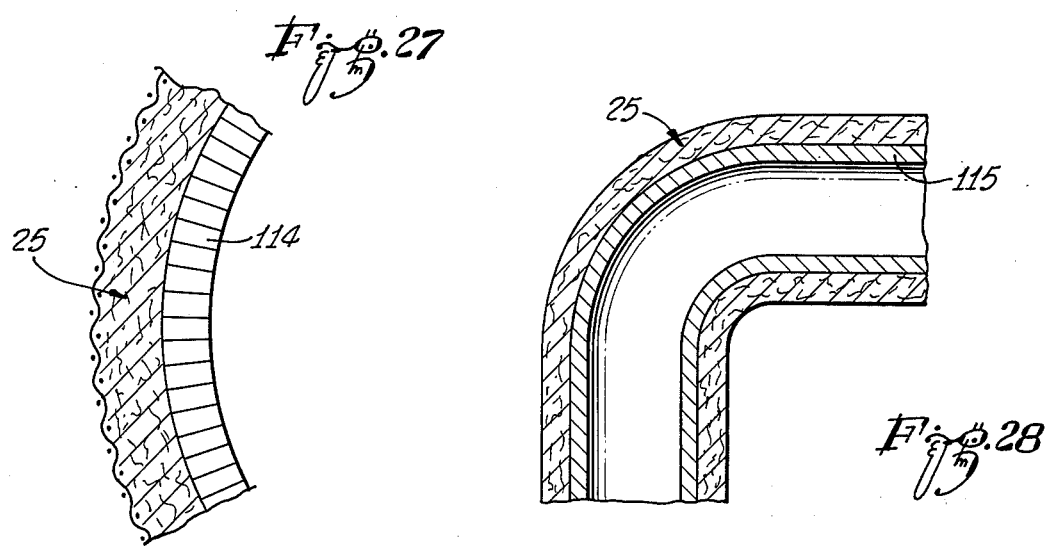
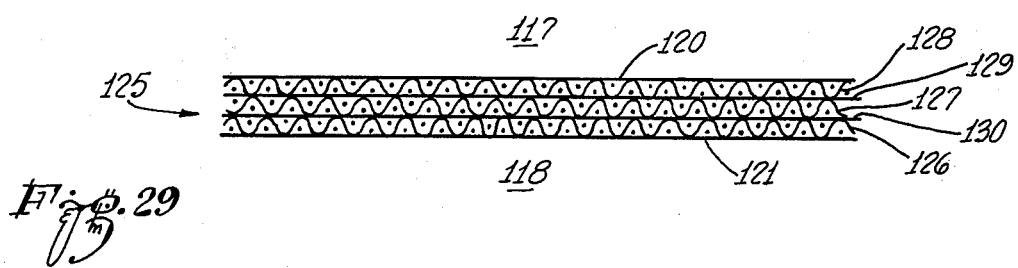
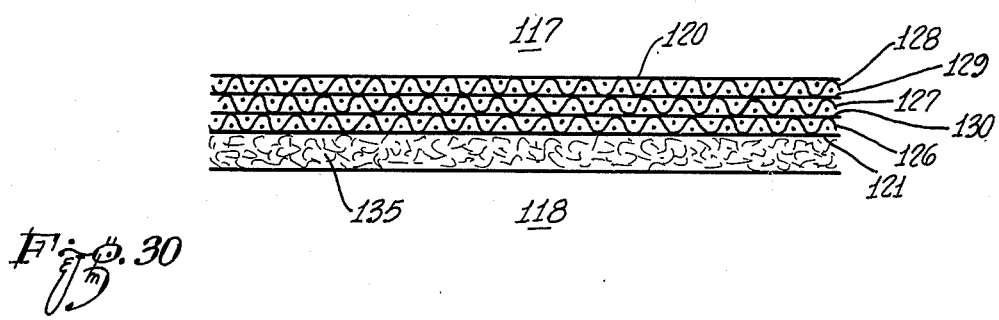

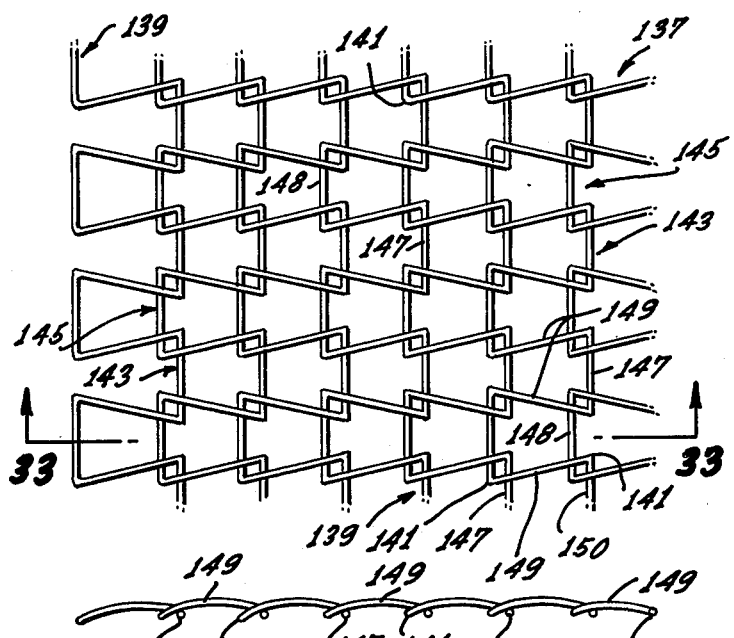
FIG.31
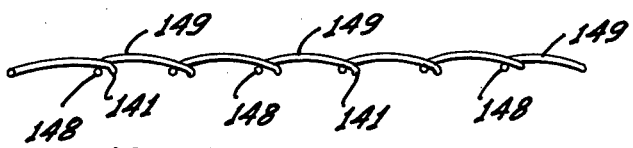
FIG.32
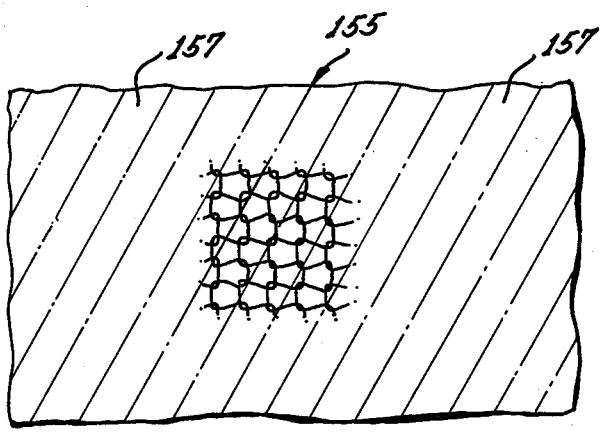
FIG.33
FIG.36
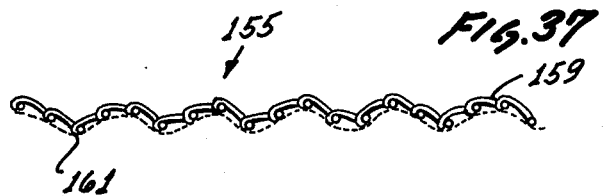
FIG.37
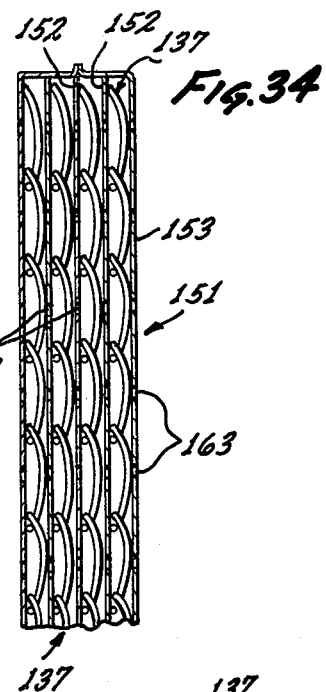
FIG.34
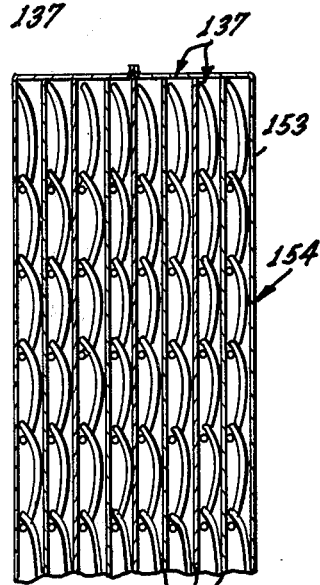
FIG.35

INSULATION SYSTEM

CROSS-REFERENCE TO RELATED APPLICATIONS

This application is a continuation-in-part of abandoned U.S. application Ser. No. 352,218, filed Apr. 18, 1973, which is a continuation-in-part of abandoned U.S. application Ser. No. 272,468, filed July 17, 1972, and assigned to the same assignee. Reference is also made to abandoned U.S. application Ser. No. 272,469, filed July 17, 1972, and assigned to the same assignee.

BACKGROUND OF THE INVENTION

1. Field of the Invention

This invention relates to thermal insulating composites, and more particularly to an improved thermal insulation composite which is principally of metal, is of low conductivity, relatively lightweight, and which may be fabricated into structural forms of significant mechanical strength and chemical stability.

2. Description of the Prior Art

The prior art includes numerous types of insulations, each having particular physical and thermal characteristics, thereby rendering these different materials particularly adaptable to a given application.

For example, U.S. Pat. No. 273,688 of Mar. 6, 1883 describes a metal mesh positioned adjacent to a conduit so as to keep a thermally non-conducting plastic mass or cement spaced from the conduit thus forming a dead air space between the conduit and the non-conducting mass.

U.S. Pat. No. 2,179,057 of Nov. 7, 1939 describes the use of an asbestos paper having nibs on it. Nibbed sheets are laid up such that each nibbed section forms an air cell. Also disclosed is the use of aluminum foil laminated to the asbestos paper nibbed sheets.

U.S. Pat. No. 2,514,170 of July 4, 1950 relates to a thermal insulation for jet engines and the like in which various forms are illustrated. In one form, an open metal mesh supports a pocket filled with asbestos and the like in spaced relation to a tubular member. In another form, a radiation shield in the form of a foil is used, the outer surface being an asbestos cloth. Several other forms of thermal insulation are shown, each using wire mesh members.

U.S. Pat. No. 3,007,596 of Nov. 7, 1961 describes an insulation made up of alternate layers of radiation shield material and an insulation material such as glass wool.

For high temperature use, e.g., 200° F. to 4000° F., various materials are commercially available, but are non-metallic in nature. Typical are aluminum silicate powders, silica fibers, zirconium oxide powders, potassium titinate, glas fibers, aluminum fibers, expanded pearlite, collodial silica and silica aerogels. These materials may be used as ceramic foams (silica carbide, aluminum zirconia and silica) with organic binders such as an epoxy resin. Multilayer ccomposites of fiber glass or foam blankets are also available.

While certain of these materials have low thermal conductivity, e.g., about 0.2 btu/hr.-ft$^2$-°F/inch for mixture of powders and polymer binders, they also have high densities, for example 20 to 30 lbs/ft$^3$, although some commercially available materials, in the form of batting, have densities as low as 3.5 lbs/ft$^3$.

As a general rule, these materials have low compressive strengths, i.e., about 3600 lb/in$^2$ at densities of 30 lbs/ft$^3$. Moreover, there are serious limitations on the environments in which they can be used, e.g., chemical, structural, etc. In some cases, there may be erosion problems or moisture affinity or affinity for certain gases which adversely affect performance of the insulation system. Weight and thickness may also present some problems especially when the insulation is to be used in the aircraft or aerospace fields, in that in order to provide adequate protection, the insulation may be too bulky, too heavy or inherently incapable of providing the structural strengths needed for the severe physical environment in which the insulation is to be used.

For example, in helicopter rotor blades which are designed to provide a gas duct for engine exhaust, it is desirable to insulate the interior surface of the rotor blade from the exhaust gases. In such an application, the exhaust gases may be as high as 1000° F. at a pressure of 40 pounds per square inch absolute with an internal flow Mach number of 0.45. From these extreme conditions inside the rotor blade, it is desirable to limit the temperature of the rotor blade to a value such as 180° F. for several reasons. At a temperature of 180° F., the blade can be formed from conventional materials. This would be advantageous at least from economical and structural stand points. Also, by decreasing the temperature of the blade, the infrared signature is lowered so that the helicopter cannot be as easily detected at night. This is desirable in military applications.

In such a severe environment an insulation having physical characteristics for withstanding a temperature such as 1000° F. and thermal characteristics including a thermal conductivity as low as air would be quite desirable. The insulation systems presently available which have these characteristics unfortunately are deficient structurally. For example, some prior art and presently available insulation systems include chalk-like materials which have a tendency to crumble and spall. These characteristics have made such insulation systems not well suited for use in severe environments such as a rotor blade where extreme vibration and centrifugal loads are present. The chalk-like materials are moisture absorbent and chemically reactive with exhaust products. High temperatures may vaporize the moisture and alter the composition of the insulation itself to produce undesirable gases within the insulation. This is typically referred to as outgassing. Furthermore, in proximity to the high velocity fluids, these materials can be expected to erode so as to decrease the thickness of the insulation. A reduced thickness would be detrimental not only to the structural characteristics but also to the thermal characteristics of the insulation.

It is well known that air space is an effective insulation medium at least when conduction is the primary mode of heat transfer. Within an air space, however, modes of heat transfer other than conduction can be of importance. For example, it is known that in a gravity field air will circulate and thereby carry heat from a hotter surface to a colder surface. This is referred to as natural convection.

Heat also can be transferred in an air space if the air is blown or forced between the surfaces. This is commonly known as forced convection. Finally, heat can be transferred through an air space by radiation wherein rays emitted from a hot surface impinge upon and thereby heat a colder surface.

In an attempt to minimize the heat transfer by natural and forced convection, air has been confined by various apparatus to create the air spaces. It will be appreciated, however, that in order to adapt an air space insulation system to severe environments, it is desirable that the confining apparatus have characteristics for withstanding the severe conditions. Many of the confining apparatus of the prior art have had thermal expansion characteristics which have caused them to elongate excessively. In addition, many of the confining apparatus of the prior art have been incapable of withstanding the extreme temperatures such as 1000° F.

To compound the problem, the confining apparatus of the prior art have not included means for venting the air spaces and, as a result, pressure differentials have developed across the skin sheets. Furthermore, some of the confining apparatus have been moisture absorbent. High temperatures have vaporized the moisture and thereby created pressures within the air spaces. These internal pressures have created significant forces on the skin sheets and resulted in damage to the insulations.

Means for attaching the insulation to a surface have been particularly ineffective where vibration has been severe. Also, when the air spaces have been particularly large, the convection of heat has been a detrimental factor. Means for attaching the elements of prior insulation systems to one another or to a supporting structure have severely degraded the thermal properties of the insulation in order to attain the structural integrity desired. Furthermore, the confining apparatus of the prior art have been particularly heavy especially for use in an aircraft.

Typical of the fields of use for thermal insulation are ducting for high temperature fluids at high or low pressures. Fire walls for fuel tanks on aircraft or engine fire walls, and fire walls for ground structures are another typical area of us. In the case of fire walls in aircraft, the Federal Aeronautics Administration currently specifies that the fire wall be capable of withstanding temperatures of 1800° F. for ten minutes. These criteria have been met by the use of solid sheet steel plates having a density of 494 lbs/ft³, an extremely high density for materials used for such ancillary, but necessary equipment.

SUMMARY OF THE INVENTION

The thermal insulation of this invention is provided with a plurality of skin sheets spaced by at least one spacing member. The spacing member can be deformed in at least one direction to define with the skin sheets a plurality of spaces typically enclosing a fluid such as air. The skin sheets, one of which may be formed by the structure to be insulated, and the spacing members are formed of metals, preferably metals such as stainless steel, molybdenum, or any other refractory metal which can remain functional in an environment having an elevated temperature. Where one of the skin sheets is formed by the structure to be insulated, that sheet need not be metal.

The use of metals as the principal functional components provides the insulation with significant advantages. Metals are not moisture absorbent so that the outgassing problems associated with the prior art do not occur. Furthermore, the components of the insulation can be attached to various supporting structures by welding to provide a joint of significant strength which also can be subjected to the elevated temperatures. Additionally, since the principal functional components of the insulation are metal, the composite may be formed into various self-supporting and structural shapes having unique physical strengths not normally possible with thermal insulation of the prior art. These strengths are achieved at lower densities and can be quite high, e.g., compressive strength of 20,000 lbs. psi at a density of 30 lbs/ft³.

Thermal insulation formed from metals is highly resilient and can withstand other conditions which might contribute to a severe environment. For example, it can withstand a high degree of vibration and can be exposed to fluids traveling at significant speeds. These characteristics make the insultion particularly adaptable for use in ducting, e.g., the interior of a hot gas duct such as the rotor blade of a helicopter.

One or both of the skin sheets may be perforated to vent the air spaces and thereby alleviate pressure differentials which might otherwise occur across the skin sheet. For example, the skin sheet can include a wire screen. A screen is particularly advantageous for this purpose because it can be calendered to smooth its surface and thereby minimize undesirable boundary layer effects in the fluids traveling adjacent to the surface.

The wire screen also is advantageous since it provides open spaces between the wires for absorbing internally any elongation of the wires which may be caused by thermal expansion. Thus, when the insulation is used in proximity to fluids having elevated temperatures, it will not have a substantial elongation in any particular direction.

The spacing members can be dimpled in at least one direction to contact one or both skin sheets at the apex of each of the dimples. In this embodiment, the spacing member can be attached to the skin sheet by means of a spot resistance weld at each of the points of contact. The spot welds limit the contact between the spacing members and the skin sheet and the dimples provide a relatively long conduction path. The spot welds and the dimples substantially inhibit conduction transfer of heat between the skin sheets. The air spaces can be limited in size to substantially reduce the transfer of heat by natural convection. Furthermore, the skin sheets can be separated by more than one spacing member each providing a shield having properties for inhibiting the transfer of heat by radiation.

In combination, these advantages provide the insulation with thermal characteristics which closely approach the thermal conductivity of the fluid such as air in the spaces. The structural characteristics of the insulation make it particularly adaptable for use in a severe environment. The insulation can be relatively thin so that its use on the interior surface of a fluid-conducting duct will not substantially reduce the cross-sectional area of the duct. The insulation can be easily constructed with commercially available components and can be easily repaired.

These and other features of the invention will become more apparent with a description of the preferred embodiments taken in conjunction with the associated drawings.

DESCRIPTION OF THE DRAWINGS

FIG. 1 is a perspective view of a helicopter having an engine and rotor blades providing an exhaust duct for the engine;

FIG. 2 is a partial perspective view of one of the rotor blades shown in FIG. 1 wherein an insulation of this invention is illustrated interiorly of the rotor blade;

FIG. 3 is an elevational view of the insulation of this invention shown in FIG. 2;

FIG. 4 is a plan view of the insulation of this invention taken on line 4—4 of FIG. 3;

FIG. 5 is a somewhat diagrammatic plan view, partly in section taken along the line 5—5 of FIG. 2;

FIG. 6 is a view similar to that of FIG. 5 of a further embodiment of the insulation of the present invention;

FIG. 6A is a cross-sectional view of the insulation taken on line 6A—6A of FIG. 6;

FIG. 7 is a view similar to that of FIG. 5 of an additional embodiment of the insulation of this invention, with portions broken away;

FIG. 7A is a cross-sectional view of the insulation taken along the line 7A—7A of FIG. 7;

FIG. 7B is a view similar to that of FIG. 5 of a further embodiment of the insulation of this invention;

FIG. 7C is a cross-sectional view of the insulation taken on line 7C—7C of FIG. 7B;

FIG. 8 is a view partly in section and partly in elevation of a further embodiment of the insulation;

FIG. 9 is a cross-sectional view of the insulation taken on line 9—9 of FIG. 8;

FIG. 10 is a view partly in section and partly in elevation of an additional embodiment of the insulation;

FIG. 11 is a cross-sectional view of the insulation taken on line 11—11 of FIG. 10;

FIG. 12 is a view partly in section and partly in elevation of still a further embodiment of the insulation;

FIG. 13 is a cross-sectional view of the insulation taken on line 13—13 of FIG. 12;

FIG. 25 is a view, in cross-section, of an insulated conduit in accordance with this invention usable for liquids;

FIG. 26 is a view in cross-section of an air foil having a surface portion thermally insulated in accordance with this invention;

FIG. 27 is an enlarged fragmentary view of the portion of FIG. 26 designated A;

FIG. 28 is a sectional view of an exhaust stack insulated in accordance with this invention for reducing the infrared signature thereof;

FIG. 29 is a cross-sectional view of still another embodiment of the present invention usable as insulation for relatively high temperatures;

FIG. 30 is a cross-sectional view of another embodiment of a composite in accordance with this invention in which the low temperature side of the insulating composite is formed of a metal wool;

FIG. 31 is a plan view of a portion of a knitted wire screen which may be employed as a spacer member in a manner similar to the spacer members as illustrated in FIGS. 29 and 30;

FIG. 32 is a bottom end view of the portion of knitted wire screen shown in FIG. 31;

FIG. 33 is a sectional view along the line 33—33 of the portion of knitted mesh screen shown in FIG. 31;

FIG. 34 is a partial sectional view illustrating a composite thermal insulation made up of alternating layers of a knitted wire mesh screen with the mesh layers being separated by layers of a thin metallic foil and the exterior of the composite being enclosed with a layer of metal foil;

FIG. 35 is a partial sectional view of a composite insulation, similar to that shown in FIG. 34, in which a greater number of alternating layers of knitted wire mesh screen and thin metallic foil are used to form a composite insulation material having a greater thickness;

FIG. 36 is a partial plan view of a knitted wire mesh screen, similar to FIG. 31, in which the wire mesh has been crimped to provide the screen with an undulating configuration, and FIG. 37 is a bottom end view of the knitted wire mesh screen of FIG. 36 illustrating the undulating configuration which results from crimping.

DESCRIPTION OF THE PREFERRED EMBODIMENTS

Figure 14:
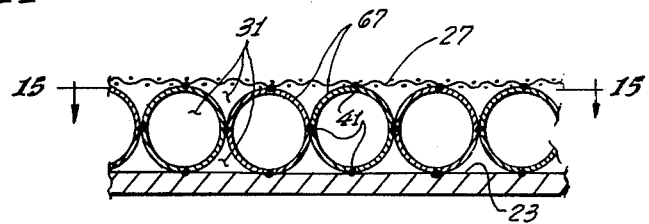
FIG. 14 is a cross-sectional view of an additional embodiment of the insulation.

Referring to the drawings, which illustrate preferred forms of this invention, the principles of this invention and several forms of structure in accordance with this invention will initially be described with reference to the helicopter designated by the reference numeral 11. In addition to a supporting structure 12, the helicopter 11 includes an engine 13 fixed to the supporting structure 12 and rotor blades 15 rotatably mounted on the supporting structure 12. Each of the rotor blades 15 is defined by a root 17 at its mounted end and a tip 19 at its free end.

The blades 15 of the helicopter, in the form shown here, are substantially hollow to provide a duct for exhausting the combustion gases expelled from the engine 13. For example, the combustion gases typically enter the blades 15 in proximity to the root 17 and leave the blade 15 in proximity to the tip 19. This exhaust system is advantageous since the combustion gases produce a force contributing to the angular displacement of the blades 15. The exhaust gases have an elevated temperature and may be as high as 1000° F., a pressure of 40 lbs. psi absolute, and an internal flow Mach number of 0.45.

The rotor blades 15 typically will have an outer surface 21 and an inner surface 23. As illustrated in FIG. 2, an insulation composite 25, in accordance with this invention, is mounted on the inner surface 23 at least a portion of the distance between the root 17 and the tip 19 of the blades 15. In this manner the insulation 25 provides a means for maintaining the rotor blade 15 at a temperature substantially less than the elevated temperatures of the exhaust gases. In doing so, the insulation 15 provides significant advantages to the helicopter 11. First of all, if the blade 15 were not insulated, it would have to be constructed of materials having characteristics for withstanding the elevated temperature of the exhaust gases. However, these materials typically are quite heavy and thereby significantly add to the weight of the helicopter 11.

It can be appreciated that the higher the temperature of the outer surface 21 of the rotor blade, the greater will be the amount of heat lost to the atmosphere. This loss of heat may be as high as 1.7% of the available energy of the system and may correspond to a 1.2% loss in rotor horsepower. By mounting the insultion 25 on the inner surface 23 of the rotor blade 15, this loss in rotor horsepower can be reduced to 0.5%.

Furthermore, if the blades 15 were not insulated they would soon achieve the temperature of the exhaust gases. Blades having an elevated temperature such as 1000° F. would have a particularly high infrared signature which would make them more easily detectable at night. It can be appreciated that this infrared signature is preferably minimized in military applications. With the insulation 25 lining the inner surface 23 of the blade 15, the temperature of the outer surface 21 may be substantially reduced, e.g., 75° F., to provide the helicopter with a relatively low infrared signature. The inner surface 23 (interior principal structural surface) of the blade 15 may have a temperature such as 180° F. so that conventional materials having high structural rigidity and relatively low weight can be used to form the structure of the blade 15.

It will be appreciated that although the insulation of this invention has particular application in the rotor blades of a helicopter, its thermal and structural characteristics make it particularly advantageous for use in many other insulation environments. For example, the insulation can be effectively used to line the inner or outer surface of any duct or pipe where it is desirable to maintain the temperature of the pipe at a level less than the temperature of the fluid being conducted by the pipe. The insulation can be used in proximity to other surfaces or may stand by itself relatively unsupported.

In the embodiment of the insulation 25 shown in FIG. 3, a first skin sheet 27 is maintained in a spaced relationship with a second skin sheet 28 by at least one spacing member 29. Skin 27 is the high temperature side of the insulation while skin 28 is on the low temperature side, and as shown includes portions in contact with the inside surface 23 of rotor blade 15. It is understood that spacer 29 may be in the form of a flat metal mesh similar to skin 27. Skins 27 and 28 and spacer 29 are of stainless steel metal. In a modified form, an additional screen element may be interposed between surface 23 and skin 28 in which event the added screen element functions as a second skin element, and skin 28 functions as a spacer with spacer 29.

In the form shown in FIG. 3, spacer 29 cooperates with skins 27 and 28 to form a plurality of air spaces 31. Although referred to herein as air spaces, the spaces 31 may be defined in a vacuum or they may enclose fluids, either liquids or gases, other than air.

The spacing member 29 can be deformed in at least one direction such as the direction toward the skin sheet 27. The deformations can take any form but in this preferred embodiment, they comprise a plurality of first dimples 37 in the spacing member 29. In the form shown, the second skin 28 is also dimpled, as at 38, to form a plurality of additional air spaces 38a. Each of the apexes of the first dimples 37 are disposed to contact the skin sheet 27 at a point. Similarly, the apexes of the second dimples 38 are disposed to contact the first spacing member 29 at points laterally spaced between the first dimples 37. A plurality of bonding means such as the spot resistance welds 41 bond the skin sheet 27 and the spacing member 29 to maintain the same in substantially fixed relationship. For example, in the embodiment including the dimples 37 and 38, the welds 41 bond the apex of each of the dimples 37 to the skin sheet 27, and the apex of each of the dimples 38 to the first spacing member 29. The bonding means might also be provided by brazing, soldering, riveting, sewing, or clinching. As a unit, the insulation 25 is affixed to a surface in any of several known methods to secure one metal member to another, e.g., resistance welding, and the like, as mentioned.

With the configuration shown in FIG. 3, the major portion of heat (from gas in contact with skin 27) being conducted between the skin sheet 27 and the inner surface 23 will pass along the spacing member 29. It will be noted, however, that the heat being transferred in this manner will have a relatively long conduction path along a particular first dimple 37, over to a particular second dimple 38 and along the particular second dimple 38 to the inner surface 23. A long conduction path is desirable since the longer the conduction path the greater the resistance to heat transfer.

In the configuration of FIG. 3, the conduction path can be lengthened by maximizing the separation of the dimples 37 and 38 on the respective members 29 and 28. However, this separation usually is limited to provide the desired support for the skin sheet 27. For example, in the illustrated embodiment, the first dimples 37 are disposed on the spacer member 29 in rows and columns one-half inch apart (FIG. 4). The second dimples 38 are similarly disposed on the second skin surface 28. The rows and columns of the second dimples 38 can be aligned intermediate the respective rows and columns of the first dimples 37. This configuration maximizes the distance between the first dimples 37 and the second dimples 38 for a given spacing of rows and columns and provides a high degree of structural support for composite structure 25.

Heat also can be conducted from the skin sheet 27 to the inner surface 23 across the air spaces 31 and 38a. It is well known, however, that air has a relatively low thermal conductivity, such as 0.24 but/hr.-ft²/°F/inch, so the conduction of heat across the air spaces 31 and 38a is minimal.

The thickness of the insulation 25 may have a dimension as thin as 0.13 inches. This is advantageous for at least two reasons. First, if the insulation 25 is thin, the air spaces 31 and 38a also will be limited in thickness. This will inhibit the circulation of the air within the spaces 31 and 38a so as to reduce the transfer of heat by natural convection. Second, a thin insulation will take up less of the cross-sectional area inside the blade 15 so that more of the area is available to exhaust the gases.

The skin sheets 27 and 28 and the spacing member 29 are preferably formed from a metal having characteristics for withstanding the elevated temperatures of its environment. In the preferred embodiment wherein exhaust gases having a temperature such as 1000° F. flow adjacent to the insulation 25 (on the side of skin 27), the skin sheets 27 and 28 and the spacing member 29 can be formed from stainless steel, titanium, molybdenum, or any other high temperature alloy or refractory metal.

As shown in FIG. 5, the skin sheet 27 includes portions defining a plurality of perforations 43 extending through the first skin sheet 27. Accordingly, the first skin sheet 27 may be a thin foil with perforations formed therein, and in some instances it may be desired to use perforations of micro size, e.g., microscopic in dimension. Where venting is not an important need, skin 27 may be imperforate foil. When used, perforations 43 provide means for venting the air spaces 31 so that a pressure differential is not developed across the first skin sheet 27. Without the perforations 43, the pressure differentials may exert upon the first skin sheet 27 substantial forces which tend to damage the insulation 25. To compound the problem, these forces may tend to deform the first skin sheet 27 in a direction to increase its resistance to the flow of gases within the blade 15.

The skin sheets 27 and 28 and the spacing member 29, in the form illustrated comprise wire screen shown generally at 45 and include a plurality of woven wire strands 47. A plurality of interstices are defined between the wires 47 to provide the perforations 43 in the skin sheet 27. The weave of the wire screen 45 can take the form of any of several known patterns including the stranded weave, and the twilled weave pattern, and the plain square weave shown in FIG. 5. The screen 45 may be in the form of a mesh of 150 wires per inch. These wires 47 may have a diameter of 0.0026 inches to provide the screen 45 with an open area of 37% and a weight of 0.07 lb/ft². Other wire sizes and configurations will be obvious to those skilled in the art, e.g., as fine as 500 wires per inch or more.

The wire screen 45 is preferred for the skin sheets 27 and 28 and the spacing member 29 for another significant reason. It is well known that materials, particularly metals, a elongate when heated. The extent of the elongation is dependent upon the characteristics of the material and the change in its temperature. This thermal expansion has been a particular problem with insulations of the prior art especially when used in helicopter rotor blades. For example, when the blade 15 is cold, the inner surface 23, the spacing member 29, and the skin sheets 27 and 28 will have temperatures substantially equal to the ambient temperature such as 59° F. However, as the blade 15 is heated by exhaust gases having a temperature such as 1000° F., the skin sheet 27 may rise to a temperature such as 1000° F. while the inner surface 23 will rise to a temperature of only 180° F. The temperature of the spacing member 29 and the second skin 28 would have some value between these two figures. Thus, even if the skin sheets 27 and 28, the spacing member 29, and the blade 15 were formed of similar materials having equal lengths, the first skin sheet 27 might tend to elongate a greater distance than the blade 15 merely because its change in temperature would be greater. In most applications, this cannot be tolerated especially if the skin sheet 27 is attached to the blade 15 at discrete locations. Under such circumstances, the difference in elongation would tend to break the attaching structure. Furthermore, the insulation 25 might tend to extend beyond the tip 19 of the blade 15.

Where this problem exists, and where growth or appreciable changes in the relative dimensions of the elements making up insulation 25 are matters of concern, the problem is solved by use of screens as one or both of the skin members. For example, skin 28 may be a foil because it is in a "low temperature" zone, while the first skin sheet 27 comprises a wire screen 45. As the wires 47 in the wire screen 45 elongate in response to the change in temperature, they tend to expand internally into the interstices 49. In this manner, the elongation of the skin sheet 27 can be limited to the elongation of the blade 15.

Whenever a fluid flows in proximity to a surface, a layer of the fluid adjacent to the surface has a relatively low velocity. This layer is commonly referred to as the boundary layer. When the flow of the fluid is to be maximized, it is desirable to minimize the boundary layer. This is accomplished in the preferred embodiment by providing the first skin sheet 27 with a surface as smooth as possible in the direction of the fluid flow. For example, the wire screen 45 can be drawn between pressured rollers to calender the screen 45. In another embodiment, the wires 47 can be provided with a rectangular cross section prior to weaving. This will also provide the wire screen 45 with a relatively smooth surface to minimize the thickness of the boundary layer. Another alternative is to use a thin metal foil, which may be perforated on a micro or macro dimension, for the purpose of venting pressure on the backside of the first skin 27 if the particular application warrants this.

To further reduce the resistance to gas flow in the direction of the blade 15, the wire screen 45 can be mounted so that the wires 47 are disposed at an angle as 45° to the flow of the exhaust gases, as illustrated in FIG. 5.

In further embodiments of the insulations, elements having properties similar to those in previous embodiments are designated by the same numeral followed by a lower case letter. For example, in FIG. 6 a further embodiment of the skin sheet 27 is designated by the reference numeral 27a. The skin sheet 27a can be formed from sheet metal 50 which has been provided with deformation preferably extending in at least two directions. For example, as shown in FIGS. 6 and 6A, the skin sheet 27a can be deformed to provide a plurality of first corrugations 51 extending in a first direction and a plurality of second corrugations 53 extending in a second direction transverse to the first direction. The first and second corrugations can be arranged in a multiplicity of diamond shaped patterns, one of which is shown generally at 54 in FIG. 6. The diamond shaped patterns 54 can be arranged to define a multiplicity of straight lines 56 in which case it may be desirable to provide a plurality of slots 58, each extending through the skin sheet 27a and bisecting an associated one of the lines 56. The corrugations 51 and 53 and the slots 58 provide means for absorbing the thermal growth of the insulation 25 interiorly of the skin sheet 27a. Furthermore, if the first and second corrugations 51 and 53, respectively, extend in two normal directions, thermal growth of the insulation 25 in any direction can be absorbed by the skin sheet 27a itself.

Where the deformed skin sheet 27a is used, it is preferably disposed within the blade 15 so that the corrugations 51 and 53 are at a 45° angle to the flow of the exhaust gases. This will decrease the depth of the boundary layer created in the exhaust gases. The diamond shaped patterns 54 are merely representative of patterns which provide the sheet metal 50 with deformations for absorbing thermal expansion, wherein the slots 58 provide means for bisecting straight lines in the pattern and for venting the air spaces beneath the skin sheet 27.

If the insulation 25 is used in proximity to a fluid, it may be desirable that the skin sheet 27 remain unperforated so that the fluid will not penetrate the insulation 25. An embodiment having an unperforated skin sheet 27b is shown in FIG. 7. The skin sheet 27b can be stamped or otherwise formed to provide deformations which define a pattern substantially free of straight lines. Such a pattern is preferred so that thermal expansion can be accommodated without buckling within the limits of the skin sheet 27b.

In this embodiment, the deformations comprise a plurality of circular patterns 75, each defined by a multiplicity of concentric annular shoulders 77, forming a circular step configuration. Each of the circular patterns 75 is preferably disposed substantially tangential to the circular pattern 75 adjacent thereto so that straight lines do not appear in the pattern of the deformations.

Another form of the insulation 25, is shown in FIGS. 7B and 7C where an unperforated skin sheet 27c is provided with deformations which include a plurality of convolutions 79, extending in at least two directions. Each of the convolutions 79 preferably intersects at least one of the other convolutions 79, so that thermal expansion along each of the convolutions 79 can be absorbed by the respective intersecting convolution 79.

Each of these skin sheets 27, 27a, 27b, and 27c, can be used in conjunction with various embodiments of the spacing member 29, and second skin members 28. For example, in a further embodiment of the insulation 25 as shown in FIGS. 8 and 9, the second skin member 28a is deformed to provide a plurality of corrugations 61, each extending diagonally across the rows and columns of the dimplex 37 in the first spacing member 29. The corrugations 61 can be disposed to contact the spacing member 29 along the portions extending between the first dimples 37. The spot welds 41 can be spaced on half inch centers along the lines of contact between the corrugations 61 and the first spacing member 29. In this embodiment, the insulation 25 is preferably disposed within the blade 15 so that the second corrugations 61 extend at a 45° angle to the flow of the exhaust gases.

In an additional embodiment of the insulation 25 of FIGS. 8 and 9, the spacing member 29 is deformed to provide a plurality of first corrugations, rather than dimples 37, extending in a first direction. In this embodiment the second skin member 28a is provided with the second corrugations extending in a second direction transverse to the first direction of the corrugations in the first skin sheet. The spot welds 41 are preferably made along the second corrugations where they contact the spacing member 29, and along the first corrugations where they contact the skin sheet 27. In the preferred embodiment, this insulation is disposed in the blade 15 so that the first and second corrugations, respectively, extend at an angle such as 45° to the direction of flow of the exhaust gases.

For reasons previously discussed, it may be desirable to form the spacing member 29 from wire screen. However, for some applications it may be advantageous to form the spacing member 29 from sheet metal foil having a thickness such as 0.002 inches.

The spacing members formed from sheet metal foil may be particularly advantageous in the embodiment shown in FIGS. 10 and 11 wherein the first spacing member 29 includes a plurality of corrugations, the two sheets being separated by a mesh member 59 positioned as indicated. For example, the spacing member 29 includes the first corrugations 61 and the second skin member 28 includes the second corrugations 63 at right angles to corrugations 61. In this embodiment, portions of the first corrugations 61 include a plurality of slots 65, and portions of the second corrugations 63 include a plurality of slots 67. The slots 65 and 67 can extend individually in any direction across the corrugations 61 and 63, respectively. However, in the preferred embodiment, each of the slots 65 and 67 is disposed in a plane substantially perpendicular to the direction of the respective corrugations 61 and 63. The slots 65 and 67 can have a width such as 0.008 inches and can be disposed at intervals such as one inch along the corrugations 61 and 63.

The slots 65 and 67 are particularly advantageous to this embodiment of the insulation system. First, they provide means for venting the air spaces 31 so as to inhibit the formation of pressure differentials across the insulation 25. Second, the slots 65 and 67 provide space internally of the insulation 25 into which the sheet metal can expand in a direction transverse to the respective corrugations 61 and 63. Thus, to accommodate thermal growth, the sheet metal comprising the spacing member 29 can be provided with the first corrugations 63 extending in a first direction and the slots 67 therein extending in a second direction. Similarly, the sheet metal comprising the second spacing member 30 can be provided with the second corrugations 61 extending in the second direction and the slots 65 therein extending in the first direction.

Each of the skin sheets 27 and 28 and the spacing member 29 provides a barrier to the transmission of heat by radiation. The greater the number of radiation barriers, the less heat will be transferred between the skin sheet 27 and the inner surface 23. One means for increasing the number of radiation barriers is to provide additional spacing members between the skin sheets 27 and 28. Depending on the thickness of the air spaces 31, the heat transfer coefficient of the insulation 25 may be reduced by as much as 0.4 btu/hr-ft$^2$-°F with each addition of a spacing member or other radiation shield. Since additional air spaces would be defined, an additional spacing member could also improve the low conduction characteristics of the insulation 25. It can be appreciated, however, that other factors such as size, weight, and cost may detract from the advantages associated with the inclusion of an additional spacing member.

It is possible to provide an additional radiation shield without adding substantially to the thickness of the insulation 25. For example, the planar mesh member 59 can be disposed between the spacing member 29 and second skin member 28, respectively, in any of the foregoing embodiments. The planar member 59 is preferably formed from wire screen to achieve the advantages previously discussed. Alternately member 59 may be metal foil, perforated if needed for pressure relief purposes.

In another embodiment of the insulation 25, as shown in FIGS. 12 and 13, the spacing members include a plurality of tubular members 68 arranged with their ends 69 in contact. The tubular member 68 is formed from stainless steel wire screen into the shape of a cylinder having an outside diameter such as 0.1875 inches. The length from end to end 69 is approximately six inches for example. The tubular members 68 can be butted end to end to form a multiplicity of columns 71 extending in a particular direction. The columns 71 can then be disposed side by side so that each of the columns 71 is in contact with an adjacent one of the columns 71 on either side thereof, as seen in FIG. 12. The columns 71 can be attached by the resistance welds 41 spaced a distance such as one-half inch along the lines of contact.

Each of the tubular members 68 can contact at least one of the first skin sheet 27 and member 23. For example, with reference to FIG. 12, the tubular members 68 can include a top group of the columns 71 spaced a dimension less than the outside diameter of the tubular members 68 and disposed to contact the skin sheet 27. A lower group of the columns 71 can be similarly spaced and disposed to contact the inner surface 23 of the blade 15. In this configuration, the columns 71 forming contiguous pairs are disposed in opposite ones of the upper and lower groups of the columns 71.

Figure 15:
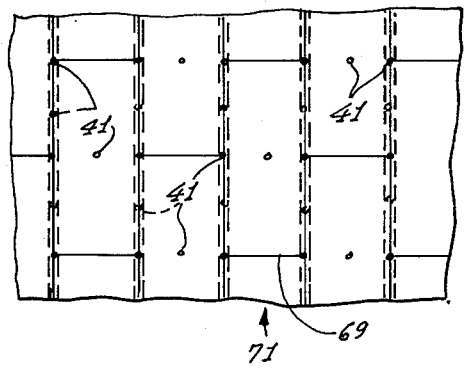
FIG. 15 is a cross-sectional view of the insulation taken on line 15—15 of FIG. 14.

In another embodiment of the insulation 25, shown in FIGS. 14 and 15, each of the tubular members 68 in the columns 71 is disposed to contact both the skin sheet 27 and the inner surface 23. In this embodiment, the thickness of the insulation 25 is substantially equal to the outside diameter of the tubular member 67.

In the form illustrated in FIGS. 12 and 13, one set of tubular members functions both as a spacer and as a second skin member, in the sense that the portion of the composite defined by the surface of the tubular members facing surface 23 is the second skin surface. In the form shown in FIGS. 14 and 15, the single layer of tubular members likewise functions both as a spacer and includes surface portions defining the second skin surface, as illustrated.

Figure 16:
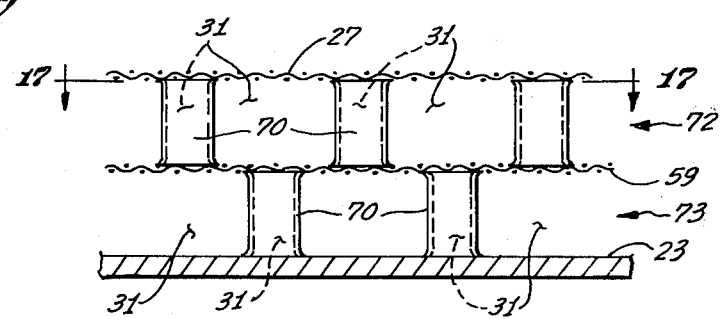
FIG. 16 is a view partly in section and partly in elevation of still a further embodiment of the insulation.
Figure 17:
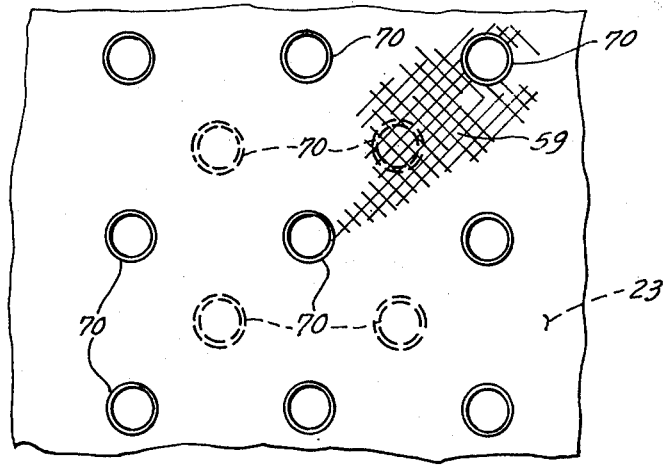
FIG. 17 is a cross-sectional view of the insulation taken on line 17—17 of FIG. 16.

In still a further embodiment of the insulation 25, shown in FIGS. 16 and 17, the spacing members comprise a plurality of standoffs or posts 70 each having a generally cylindrical configuration with a wall thickness such as 0.005 inches and an outside diameter such as one-sixteenth inch. The posts 70 preferably are disposed with their axial direction substantially perpendicular to the skin sheet 27 and the inner surface 23. With reference to FIG. 16, it will be noted that the insulation can include the planar member 59 wherein an upper group 72 of the posts 70 is disposed between the skin sheet 27 and the planar member 59, and a lower group 73 of the posts 70 is disposed between the planar member 59 and the inner surface 23. The ends of the posts 70 can be flared to provide a broader base for support.

The posts 70 comprising the upper and lower groups 72 and 73, respectively, can be disposed in rows and columns spaced a distance such as one-half inch. In the preferred embodiment, the rows and columns of the upper group 72 are disposed intermediate the rows and columns of the lower group 73 of the posts 70. This configuration maximizes the length of the conduction path between the skin sheet 27 and the inner surface 23 to reduce the transfer of heat therebetween.

Here again the lower group 73 of posts has a twofold function, one is a spacer function and the other is to form the second skin surface. It is understood, however, that under certain conditions it may be desirable to include a separate second skin member between the portion of the spacers forming the second skin surface. Such separate skin member may be mesh or foil or perforated foil depending on the nature of the installation. Typically, a second skin member may be used when the insulation composite is assembled at one location and installed at another location, i.e., a "retrofit" operation.

The foregoing embodiments of the insulation have provided structural temperatures listed in the following table. The individual embodiments are distinguished with respect to the numbers of their respective figure. For example, the embodiment number 3–4 designates the embodiment shown in FIGS. 3 and 4 wherein the members 28 and 29 include the dimples 37 and 38 respectively. The structure temperature tabulated is that temperature measured on the inner surface of the rotor blade when the temperature of the exhaust gases was 965° F. Also tabulated is the weight per square foot of each of the preferred embodiments of the insulation.

| Embodiment Number | Weight per square foot, lbs. | Structural Temperature ° F. |
|---|---|---|
| 3–4 | .158 | 180 |
| 8–9 | .158 | 205 |
| 10–11 | .202 | 205 |
| 12–13 | .207 | 207 |
| 14–15 | .212 | 205 |
| 16–17 | .24 | 237 |

The foregoing embodiments of the insulation 25 are particularly adapted for use in a severe environment. For example, the insulation can be disposed on the interior surface of an exhaust duct to insulate the duct from the high speed and elevated temperatures of exhaust gases. The insulation may have thermal conductivity as low as 0.24 btu/hr-ft$^2$-°F/inch, so that with a minimum thickness the insulation can contact exhaust gases having a temperature such as 1000° F. and still maintain the inner surface of the supporting structure at a temperature such as 180° F. Furthermore, the insulation can be constructed of refractory metals such as molybdenum and titanium to provide it with characteristics for withstanding the elevated temperatures.

The members 28 and 29 of the insulation can be configured to provide a relatively long conduction path so that the heat transfer of the insulation is primarily influenced by the heat transfer characteristics of the air in the air spaces. The air spaces can also be limited in size so that heat transfer by natural convection is substantially inhibited. The spacing members also can provide characteristics for inhibiting the transfer of heat by radiation.

The skin sheet 27 can include a plurality of perforations to vent the air spaces so that pressure differentials are not developed across the insulation. The skin sheet 27 can be formed from a wire screen or a piece of sheet metal deformed in a variety of patterns. These embodiments permit a high degree of thermal growth internally of the skin sheet so that the insulation does not elongate beyond the supporting structure. The wire screen can be calendered to provide the skin sheet 27 with a relatively smooth surface in contact with the exhaust gases so that the boundary layer of the gases is minimized.

By providing characteristics which can withstand a severe environment, the insulation can be disposed interiorly of the rotor blade of a helicopter so that the rotor blade can be maintained at a temperature such as 180° F. This not only reduces the loss in rotor horsepower but also lowers the infrared signature of the helicopter so that it is less susceptible to infrared detection.

Figure 18:
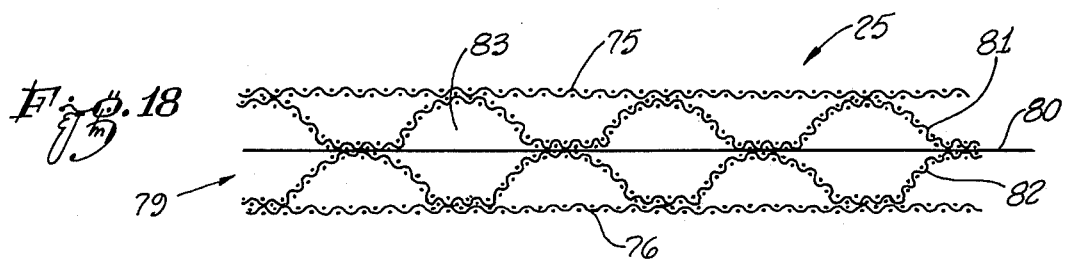
FIG. 18 is a cross-sectional view of another embodiment of this invention.

In the form illustrated in FIG. 18, the insulation composite 25 includes spaced skin elements 75 and 76 in the form of metal mesh. Various meshes of various weaves may be used, even the more complex weaves such as Plain Dutch, Twilled or Twilled Double Dutch, for example. Where such meshes are calendered, the open area of the screen or mesh is reduced, but the structure is nonetheless porous in the sense that any pressure buildup may be vented. This type of mesh arrangement has the advantage that it operates more effectively as a radiation shield to reduce transfer of heat by radiation. One or both of skin elements 75 and 76 may be of this type of mesh. It is also understood that in the embodiments previously described, calendered meshes may be used where it is desired to control radiation transfer and at the same time provide porosity for venting possible pressure buildups.

The spacer members 79 include a composite of several different elements such as a metallic foil 80 interposed between dimpled mesh spacers 81 and 82. The dimpled mesh spacers 81 and 82 may be of the type previously described, and may be of different dimple configurations, as is apparent to one skilled in the art. It will also be apparent, that a multiplicity of spacer members 79 may be used to form an insulation composite 25, that is, a lay-up of several groups of spacer members 81 and 82 separated by a foil 80 may be positioned between skin members 75 and 76. Under certain circumstances, it may be desirable to use a thin non-porous foil member in the place of mesh 75, or in the place of mesh 76. Additionally, mesh 76 may be omitted such that dimpled mesh spacer 82 forms a second skin member in addition to functioning as a spacer.

In the form shown in FIG. 18, all of the components of the thermal insulation are metallic members, for example stainless steel, although it is understood that other metals may be used as well as metal alloys and the refractory metals, if the anticipated temperature is sufficiently high.

Rather than using dimpled mesh spacers, it is within the practice of the present invention to form either or both of spacers 81 and 82 with convolutions, the spacers being disposed relative to each other such that the respective convolutions cross, that is, the rows of one set of convolutions are disposed perpendicularly to the rows of the other set of convolutions. Also, the respective rows of convolutions may be arranged to be on a diagonal, if this is desired. It will also be appreciated, that multiple assemblies of spacer members 79 in which the respective spacer elements are convoluted may be used, or combinations of dimpled and convoluted spacer elements, as desired.

In the form illustrated in FIG. 18, the composite is held together by anyone of several means such as resistance welding, sewing with stainless steel thread or stapling, and the like. In this way, all of the elements of the composite are held relatively stationary with respect to each other, and structural integrity is imparted to the thermal insulation.

As is the case with the other forms of the invention illustrated, significant strength is achieved by assembling the individual components of the thermal insulation such that the component parts thereof are held in fixed relationship as by welding or the like. Since all of the parts of the insulation composite are of metal, and preferably of stainless steel or some other alloy, substantial structural strength is achieved, contrary to some of the insulation composites of the prior art. This enables fabrication of self-supporting structural elements of a variety of shapes, and even permits assembly of the insulation into a predetermined shape at one location for installation at a remote location on a structure to be insulated.

Figure 19:
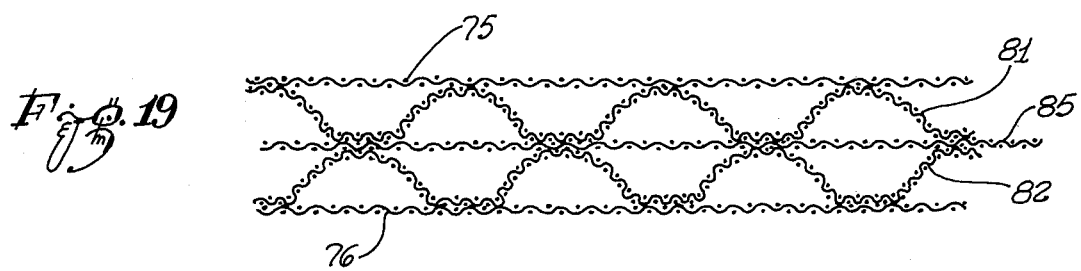
FIG. 19 is a cross-sectional view similar to FIG. 18 illustrating the use of a mesh member as a radiation shield.

In the form shown in FIG. 19, wherein like reference numerals have been used where applicable, a mesh member 85 is disposed between the dimpled mesh spacers 81 and 82, it being understood, that the various modifications heretofore described may also be used in connection with the structure shown in FIG. 19. That is, convoluted mesh spacers may be used, and where multiple spacer assemblies 79 are used, the individual spacer members may be made up of various assemblages of dimpled mesh spacers or convoluted mesh spacers, the latter slotted as described, or not as the particular installation may require. It is also possible in accordance with the present invention to use mesh and foil members alternately in the several different layers of spacer assemblies 79 in those instances in which it is desired to control radiation, while at the same time provide some porosity within the internal structure of the insulation 25.

In view of the fact that the effectiveness of a member with respect to radiation is determined by its emissivity, one of the variants in accordance with the present invention involves the use of mesh or foil members of a material having a low emissivity, that is, the member does not act as an efficient absorber and radiator of energy. Various metals and their oxides may be used as coatings either on the mesh or foil, and the preferred materials are those having a relatively low emissivity such as gold, electrolytically deposited copper, chromium, highly polished brass, highly polished aluminum, electroplated nickel, polished platnium, rhodium, rhodium-iridium alloys, polished silver, and polished zinc. The foregoing list is by no means exclusive, and other materials will be apparent to one skilled in the art, as well as the methods by which thin films may be formed. The selection of the particular material is also a function of the anticipated temperature to which it is exposed. The use of a material in the form of a coating, or in the case of a foil or mesh having low emissivity, enables reduction of the number of components necessary to control heat transfer by radiation. This may be desirable where lightweight structures are needed which are efficient as thermal insulators in those instances in which a principal source of heat transfer is radiation.

Figure 20:
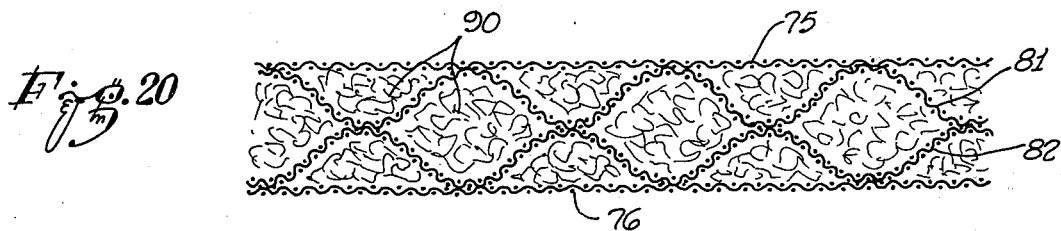
FIG. 20 is a cross-sectional view of another embodiment of this invention in which a metal wool is used in the interstices of the insulation, in accordance with this invention.

A highly efficient thermal insulation composite is illustrated in FIG. 20, wherein like reference numerals have been used where applicable. In this particular embodiment, spaced skin members 75 and 76 have interposed between them mesh members 81 and 82 which may be dimpled or convoluted, to form a plurality of void spaces 83 of the type illustrated in FIG. 18. In the form shown in FIG. 20, each of the void spaces 83 is filled with a packing of non-combustible metallic filamentary material 90 in the form of a very fine "wool" which is characterized by a substantial length relative to the diameter. The "wool" material may be of the type described in application Ser. No. 272,469, filed July 17, 1972 and assigned to the same assignee, which disclosure is incorporated herein by reference.

The effect of using the filamentary packing material 90 in the void spaces 83 is to form a multiplicity of separate and quite small air spaces, or gas spaces, such that the thermal conductivity in the spaces 83, filled with filamentary material 90, is essentially that of the gas occupying the same void space. Since the filamentary material has a substantial length relative to its cross-section, and is essentially round in cross-section, the respective filaments, which are intertwined in a mat-like arrangement, conduct crosswise only at those areas of contact, which are in effect areas of point contact because they are generally circular in cross-section of the filaments. It is understood, however, that other filamentary materials of different cross-sectional shapes may be used, e.g., elliptical, square, diamond, half circular, etc., although circular is preferred since point contact at filament cross-over points is established.

The filamentary material usable in accordance with this invention has a small diameter, e.g., between about 4 and about 25 microns and preferably in the range of 4 to 8 microns. The density of the material may vary from 2 to about 35 lbs. per cubic foot. The filaments have a substantial length to diameter ratio, e.g., 12,500 or more, and filaments of any of the metals or alloys mentioned may be used. The metal of the wool may be the same or different from the other components of the insulation, provided that no adverse electrolytic effects are created.

While the embodiment illustrated in FIG. 20 shows the use of two mesh spacers 81 and 82, it is understood that a single mesh spacer may be used to form the void spaces 83 which are filled with filamentary material 90, or in the alternative, several layers of mesh spacers, as heretofore described, may be used to form a composite. Alternately, radiation shields in the form of foils or meshes may be interposed between the spacers, if needed for reducing heat transfer by radiation.

The form of the present invention illustrated in FIG. 20 offers the advantage of providing substantial compressive strength, in view of the fact that the respective elements of the composite are held together by welding or some other manner, as described above. Where foils are not used as part of the structure, the composites described may be held together by stitching with the use of stainless steel thread. The use of stainless steel thread has advantages where filamentary material 90 is present in the void spaces, since the thread will assist in maintaining the filamentary material properly located within the respective void spaces 83.

Figure 21:
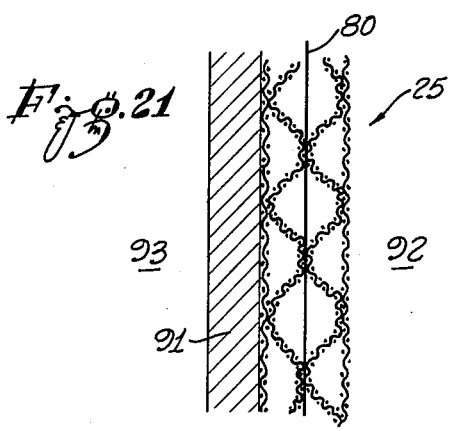
FIG. 21 is a cross-sectional view of a structure usable as a fire wall and constructed in accordance with this invention.

FIG. 21 is a diagrammatic view of the use of the thermal insulation composite of the present invention in a fire wall structure. Wall 91 may, for example, be a structural wall of an aircraft in the cabin or cockpit area, or the fire wall in an engine compartment. The hot or potentially hot side is indicated by the reference numeral 92. This may, for example, be the engine side in the engine compartment, or the side of the aircraft on which fuel tanks are mounted thus giving rise to a potential fire problem. The cold side of the fire wall structure is generally indicated by the reference numeral 93.

Interposed between the hot side 92 and the cold side 93, and supported by structural element 91 is thermal insulation 25, which may be of any of the various forms heretofore or hereafter described. In the form shown, insulation 25 is of the type described in connection with FIG. 18, the foil member 80 operating as a flame shield to prevent direct contact between the supporting wall 91 and any flame on the hot side of the insulation.

It will be apparent in connection with the embodiment shown in FIG. 21, that the insulation 25 is easily assembled to the wall structure 91. Additionally, the assembly of the insulation to the supporting structure 91 may be by a retrofitting operation, and because of the relatively thin cross-sectional dimension of the insulation 25, and its ability to protect against substantial temperatures, the thermal insulation of the present invention offers several unique desirable advantages in connection with use on aircraft and other type vehicles in which weight is a problem. It will also be apparent that structure 91 may for example be the wall of a fuel container such as a 55-gallon drum or larger structure, and that a thermal insulation 25 may be easily assembled thereto by preforming it into a jacket.

By way of specific example, a conventional aluminum fuel tank tends to burn through in about six minutes. If insulated with the thermal composite of this invention, the same fuel tank does not burn through in six minutes, and after fifteen minutes exhibits a rise in fuel temperature of 100° F. over the initial temperature.

Figure 22:
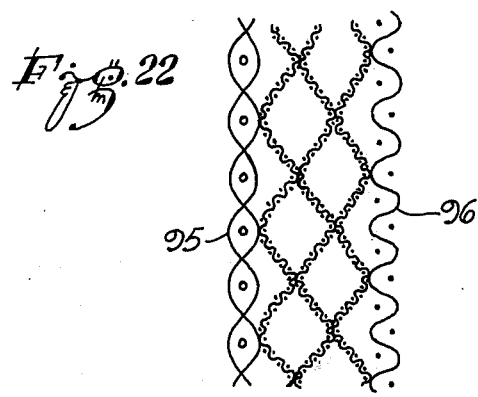
FIG. 22 is a cross-sectional view of a modification of the structure of FIG. 21 and usable as a fire wall constructed in accordance with this invention.

Another form of fire wall is illustrated in FIG. 22 in which the principal structural feature is skin member 95 which is in the form of a self-supporting mesh of the Dutch Weave variety. Spaced from mesh 95 is a second mesh 96, the space between the two meshes 95 and 96 being occupied by spacers of any of the varieties previously described. The advantage of this particular structure is that it is a self-supporting structure which may be placed wherever fire walls are needed as secondary structures. A foil member may be added to provide flame protection.

One of the principal advantages of the present invention is the fact that the efficiency of the thermal insulation composites described, especially where high temperatures are anticipated, permits the reduction in the cross-sectional dimension of the principal structural member to be protected. For example, in the case of fire walls of the type illustrated in FIG. 21, if the fire wall is to be constructed rather than a "retrofit" modification, the cross-sectional dimension of the supporting member 91 may be reduced since additional metal is not needed in order to compensate for the degradation and physical properties attributable to high temperatures.

One typical use of such ducting is in STOL type of aircraft in which there are singular advantages in being able to transport high temperature gas, e.g., 2000° F. Current practice is to use low temperature gas because of the difficulty of providing ducting usable at high temperature due to weight and/or volume problems. For example, turbine and cycle efficiency increase with temperature and the more advanced engines can utilize high temperature gases only if accompanied by air cooled blading and turbine discs. The ducting system of this invention offers the advantage of enabling the use of high temperature gases with efficient relatively low weight ducting.

Figure 23:
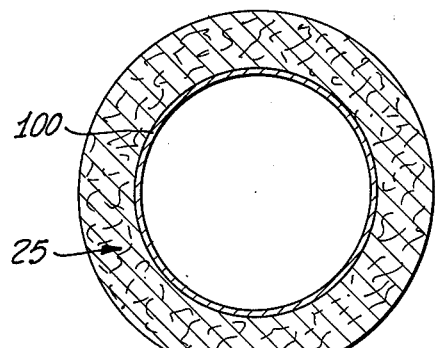
FIG. 23 is a view, in cross-section, of a conduit having insulation on the outer surface thereof in accordance with this invention.
Figure 24:
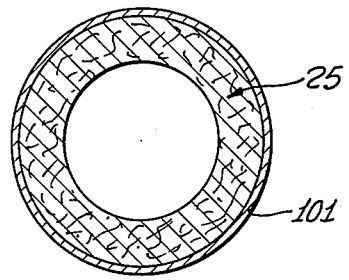
FIG. 24 is a cross-sectional view of a conduit having insulation on the inner surface thereof in accordance with this invention.

As illustrative, reference is made to FIG. 23 showing a conduit 100 having outside insulation 25 assembled thereto. The insulation 25 may be of the type previously described. In this particular form, the conduit is intended for use with gases having a temperature of approximately 1800° F. and a typical metal for such use would be a material known commercially as Inconel. Where the insulation 25 is placed on the outside of the conduit, the conduit itself is directly in contact with the hot gas and achieves a temperature approximately equal to that of the gas.

If, however, the insulation 25, of the present invention, is placed on the inside of a conduit 101, the conduit is now insulated against the gas which passes through the conduit 101. In this form, the conduit is at a considerably lower temperature and thus it is possible to reduce the cross-section to provide substantial savings in weight. In the case of an Inconel conduit, the savings in weight may be as much as 90 to 91% in those instances where there is a gas in the interior of the conduit at 1800° F. It may also be possible to substitute other metals, for example, aluminum, in which event the weight saving is substantial, above 95%.

A modified form of conduit is illustrated in FIG. 25 in which the fluid flowing through the conduit is a liquid. In this particular form, two conduits 103 and 105 are arranged concentrically, the space between them being filled with insulation 25. This type of arrangement finds particular utility for low-pressure, high-temperature liquids, the inner conduit 105 operating to prevent the hot liquid from entering the insulation 25. It is also possible in accordance with the present invention to form the inner conduit 105 as a continuous foil which forms the inner exposed surface of the insulation. Such a modification is possible in those instances in which the pressure of the liquid is not excessively high, that is not above about 50 lbs. psi.

Although shown as round, it is understood that various shapes may be used, as the particular design may require.

Referring now to FIG. 26, the use of the insulation 25 of the present invention is shown as a structural element of an air foil indicated generally as 110. As shown, the outer contour of the principal air foil surface 110 is stepped as indicated at 112, and the insulation is positioned around that portion of the air foil surface 110 exposed to relatively high temperatures.

Referring to FIG. 27, the principal structural element 114 of the air foil is shown in the form of a honeycomb, although other forms may be used. Affixed to the air foil so as to form a smooth air foil surface is insulation 25, which may be of any of the types heretofore described. In view of the fact that the thermal insulation 25 of the present invention also provides structural features, it offers singular advantages over some of the insulations of the prior art.

Another use of the thermal insulation of the present invention is illustrated in FIG. 28, in which the insulation 25 is positioned around the outside surface of an exhaust stack 115. In this particular form, the insulation 25 is used to reduce substantially the infrared signature attributable to the heated exhaust stack 115. The thermal insulation 25 may be of any of the types previously described.

Referring now to FIG. 29, a thermal insulation composite 25 is illustrated of a type usable in those instances in which extremely high temperatures are anticipated. In the form shown, the hot side is indicated as 117 and the cold is indicated as 118. In this form, the member adjacent the hot side 117 is a foil 120 and forms the outer surface member. Spaced from member 120 is a foil member 121 which defines the other surface and is positioned on the cold side 118. The spacer member 125 is composed of screens 126, 127 and 128, as indicated, with foils 129 and 130 interleaved between alternate screens as indicated.

In the particular form illustrated in FIG. 29, the foils may be of different metals. For example, foil 120 on the hot side may be of stainless steel, as well as foil 129; foils 130 and 121 may be of aluminum since they are positioned closer to the cold side 118. Screens 126, 127 and 128 may be of the same or difference mesh, and of different weaves, or may be of the same weave but of different mesh sizes. In this particular form, meshes 128 and 127 may be of stainless steel while mesh 126 may be of aluminum since the latter is positioned closer to the cold side 118.

The elements of the composite 25, described, are held together by welding or other suitable means, heretofore described. This particular form of screen is designed for relatively high temperatures, and illustrates that variant of the present invention in which different metals may be used to make up the various components of the thermal insulation.

It is understood that the foil side 120 may be positioned on the cold side, and the exposed surfaces on each side may both be foils or both screens.

A variation of the structure of FIG. 29 is illustrated in FIG. 30 wherein like reference numerals have been used where applicable. In this particular form, the screens and foils 120 and 121, and 126–130 may be of stainless steel or Inconel. Positioned over foil 121 is an insulating structure made up of wool assembly 135 which may be of the type described in connection with FIG. 20, or may be of the type referred to in the previously identified U.S. application Ser. No. 272,469.

In the structure illustrated in FIG. 30, the hot side may be exposed to temperatures of approximately 1800° F., on the hot side, providing a reduction in temperature to between 200° to 400° F. on the cold side. Typical dimensions of such a system include a wool layer 135 of between 0.3 to 0.4 inches thick, with a foil mesh layup of between 0.2 and 0.6 inches thick.

Turning to FIG. 31, there is illustrated a knitted wire mesh screen which may be used as a spacer member in forming a composite thermal insulation in a manner similar to that illustrated in FIGS. 29 and 30. As shown, the knitted wire mesh screen 137 includes mesh wires, generally indicated as 139, which each have a plurality of kinks 141. By reason of the kinks 141, the mesh wires 139 form a plurality of loops 143 which are positioned in one direction and a plurality of loops 45 which are positioned in an opposite direction. The loops 143 are formed of end wires 147 and side wires 149 while the loops 145 are formed of end wires 148 and side wires 149. As illustrated, the side wires 149 are common to both loops 143 and 145 with a side wire of one of the loops 143 being common to the immediately adjacent loop 145.

As illustrated in FIG. 31, the knitted configuration of the wire mesh 137 may be viewed in terms of a single wire 150 as shown at the right of the figure. The wire 150 is kinked at 141 to form a side wire 149 that passes over an end wire 147 and is then kinked again at 141 to form an end wire 148. The end wire 148 passes beneath a pair of side wires 149 and is then kinked again at 141 to form a side wire 149. The side wire 149 is then kinked to form a new end wire 147. As this procedure is repeated for each of the individual wires, such as wire 150, the knitted mesh screen 137 is formed with the side wires 149 of loops 143 each passing over the end wires 147 of immediately adjacent loops 143 and with the side wires then being kinked to form end wires 148 which pass beneath side wires 149 of the adjacent loops 143.

As illustrated in FIG. 31, adjacent side wires 149 are not parallel and the adjacent side wires diverge in forming the loops 143 or 145. Also, the kinks 141 in the mesh wires 139 are relatively sharp. In practice, the kniks 141 will generally have a more rounded or curved configuration and the side wires 149 will not diverge as markedly as shown in FIG. 31.

Also, as shown in FIG. 31, the loops 143 are the same in size as the loops 145. However, it is not essential that the loops 143 and 145 be of the same size and loops 143 may, for example, be either larger or smaller than loops 145.

Knitted wire mesh screen may be obtained in a variety of knitted configurations, other than the knitted configuration illustrated in FIG. 31, and may be formed from wires 139 which have a flattened configuration or wires 139 which have a circular configuration. Wire mesh may be formed from wire of various sizes such as, for example, wires ranging in size from about 0.001 inches to about 0.11 inches. Also, metallic wire mesh may be constructed from any material that can be drawn into a wire such as, for example, stainless steel of all types, inconel, hastelloy, tungsten, aluminum, copper, or galvanized.

Depending on the size of the wire, and the number of wires per inch, the population density of wires in the knitted material, i.e., the number of wires per square inch of surface, may be varied over a wide range. Knitted wire mesh is a commercially available material and may be obtained, for example, from Metex Corporation, 970 New Durham Road, Edison, New Jersey, 08817, or from ACS Industries, Woonsocket, Rhode Island, 02895.

FIG. 32 is a lower end view of the wire mesh portion 137 illustrated in FIG. 31. As shown, the side wires 149 from each of the loops 143 pass over the end wires 147 in the adjacent loops 143. After passing over the end wires 147 of the adjacent loops 143, the side wires 149 are each kinked at 141 to form end wires 148 for the loops 145 which are positioned oppositely from the loops 143.

FIG. 33 is a sectional view taken along the line 33—33 of FIG. 31 with the section line cutting through a plurality of the oppositely directed loops 145. As shown with regard to the loops 145, the end wires 148 pass beneath the side wires 149 with the end wires 148 then being crimped to pass over the end wires 147 of loops 143. Similarly, after passing over the end wires 148, each of the side wires 149 is crimped at 141 to pass beneath the next adjacent side wire 149.

FIG. 34 illustrates a composite insulation material 151 which is formed of alternate layers of knitted wire mesh 137 and layers of thin metal foil 152. The layers of thin metal foil 152, as described previously, serve as radiation barriers while the layers of knitted wire mesh 137 serve as separator members which hold the layers of thin metal foil in a spaced apart relation. The several layers of knitted wire mesh 137 and thin metal foil 152 may be encased in an outer metal covering 153 which may also be formed of thin metal foil.

An insulation material composed of layers of a knitted wire mesh and thin metal foil may be formed in various thicknesses depending upon the particular use application. Thus, composite material 154 shown in FIG. 35 has a larger number of alternating layers of knitted wire mesh 137 and layers of thin metal foil 152. In a manner similar to the composite material 151 illustrated in FIG. 34, the composite material 154 may be enclosed in an outer metal covering 153 and the outer metal covering may also be formed of a thin metal foil.

FIG. 36 illustrates a knitted wire mesh 155 which includes diagonally directed corrugations 157. The corrugations 157 may be formed in any convenient manner, such as by running the knitted wire mesh 155 through a pair of intermeshing gears. Depending upon the position of the intermeshing gears with respect to the knitted wire mesh 155, the corrugations may be directed in any desired relation with respect to the wire mesh. Thus, the diagonally directed corrugations 157 of FIG. 36 may be replaced with transversely directed corrugations or longitudinally directed corrugations, etc.

FIG. 37, which is a lower end view of the knitted wire mesh 155 of FIG. 36, illustrates the undulating configuration produced in the wire mesh by the corrugations 157. The corrugations 157 produce a plurality of crests 159 with adjacent crests being separated by troughs 161. The knitted wire mesh 155 may then be used as a separator in forming a composite structure, such as the composite structures 151 and 154 of FIGS. 34 and 35, with the knitted wire mesh 155 serving to hold the sheets of thin metal foil 152 in a spaced apart relation. The corrugations 157 in the knitted wire mesh material 155 serve to effectively increase the thickness of the wire mesh when it serves as a spacer material in forming a composite insulation. Thus, by increasing the depth of the corrugations in the wire mesh material 155, i.e., increasing the distance between the crests 159 and troughs 161, the effective thickness of the material may be increased.

As illustrated in FIG. 36, the knitted wire mesh 155 may be corrugated in one direction, such as by the corrugations 157. Also, if desired, the knitted wire mesh, such as the wire mesh material 155, may be corrugated in several directions, i.e., by corrugations which run in one direction such as the corrugations 157 and by corrugations which run at an angle which is substantially perpendicular to the direction of the corrugations 157.

As described with regard to FIGS. 34 and 35, the layers of knitted wire mesh 137 are preferably separated by layers of thin metal foil 152. However, depending upon the use environment, the layers of knitted wire mesh 137 may be separated by thin layers of a non-metallic material such as a plastic, for example, aluminized or gold coated mylar. Also, depending upon the use environment, the knitted mesh material may, in some instances, be formed from a plastic material which is capable of being extruded into a plastic monofilament, such as polypropylene, saran, tetrafluoroethylene, nylon, dacron, etc.

In FIGS. 34 and 35, the various layers of knitted mesh material 137 are illustrated as being in aligned relation within the composite structures 151 or 154. In forming a composite structure, such as structures 151 or 154, the sheets of knitted mesh material 137 are, however, generally laid up in a random fashion. Thus, the wires in adjacent layers 137 will generally not be in alignment. As stated, the knitted mesh material may be formed of either flattened or round wires. Generally, it is preferable that the knitted mesh material be formed of wire having a circular cross section. The use of wire having a circular cross section decreases the available contact area between adjacent wires within the knitted mesh layer 137 and also decreases the contact area between the knitted mesh layer 137 and an adjacent layer of thin metal foil, such as a foil layer 152 or the outer covering 153 for the composite material.

By decreasing the available contact area through the use of wires in the knitted mesh material which have a circular cross section, the opportunity for heat transfer is decreased through the knitted mesh material and also between the knitted mesh material and the metal foil surfaces in contact therewith. Desirably, the wires employed in the knitted mesh material are relatively springy such that they return to their original shape when a force is applied to the insulation material and is then removed. Thus, for example, the wires in the knitted mesh material may be hardened wires which have a high tensile strength. Also, the wires in the knitted mesh material may be annealed to give a softer insulation that may be molded more readily to cover an irregular shaped object.

An advantage in using a knitted wire mesh material as a separator in forming a thermal insulation is that the knitted wire mesh is generally lighter in weight than a woven wire screen used as a separator. A woven wire screen generally has a relatively high population density of wires, i.e., wires per square inch, and, in general, all of these wires are not necessary to provide a given offset or thickness to the separator material. In fact, when the separator material contains fewer wires, as in a knitted wire mesh material, the material may then be corrugated more readily and also corrugated over a wider range of thicknesses to provide a greater variation in thickness than may be provided with a woven wire screen.

Also, the wires in a knitted wire mesh are generally in loose contact while the wires in a woven wire screen are in relatively firm contact. For this season, the heat transfer through a knitted wire mesh is generally less than that through a woven wire screen. In addition, a knitted wire mesh is a more flexible material than a woven wire screen and the insulation material formed through use of a knitted wire mesh is, therefore, more readily deformable to shape the insulation to conform to an irregular shaped object.

In forming a composite insulation material of the type shown in FIGS. 34 and 35, the number of radiation barriers, i.e., sheets of thin metal foil 152, may be varied per unit of thickness depending upon the use application for the material. Thus, in designing an insulation material for a particular purpose, the first step in the design is to determine the number of radiation barriers desired and the total thickness of insulation that is desired. Following this, the number of separator sheets, such as the knitted wire mesh sheets 137, is determined and also the thickness of each of the separator sheets is determined. From this information, it can then be determined what offset or effective thickness each of the sheets 137 should have and the sheets may then be corrugated to the desired depth to provide the needed offset.

Preferably, at least about four radiation barriers are provided for each quarter inch of thickness of the insulation material. In general terms, the distance between adjacent radiation barriers 152 is maintained sufficiently close to reduce heat transfer between the adjacent barriers through convection to an insignificant level. This result, in general, is accomplished by spacing the radiation barriers such that the distance between adjacent barriers is about one quarter inch or less.

In those instances in which the thermal insulation composite of the present invention is used in environments which are highly oxidizing, the entire structure may be protected by an anti-oxidant coating, as is known to those skilled in the art, or in the alternative, one or more of the members may be treated to increase resistance to oxidation. For example, many of the materials usable to provide a low emissivity coating would also provide resistance to oxidation. For example, gold and platinum.

As is apparent from the foregoing description, the thermal insulation of the present invention is unique in several respects. First, it is composed substantially entirely of all metal materials. Normally one would not consider that metals are capable of providing the insulating qualities achieved by the present invention. In effect, the thermal insulation of this invention provides a low-conductivity equal to still air, or not substantially different therefrom. Moreover, the range of temperature service is substantial, as high as 2600° F. for stainless steel structures, and as high as 4000° F. for refractory metal type materials. Additionally, the insulation of the present invention is of low-weight, and exhibits excellent structural features such as compressive strength, resistance to abrasion and erosion by high velocity flows. By the use of relatively chemically inert materials such as stainless steel and the like, the prior art problems of moisture absorption and chemical degradation are largely avoided. Since the thermal material of the present invention is made of metal, there is in addition the advantage of vibration damping, acoustic reduction and high ballistic tolerance.

By way of comparison, the thermal insulation of the present invention when used with an all stainless steel fire wall provides the advantages of both reduction in weight, and reduction in heat flow. Specifically, using only 4% of the weight of the solid metal, comparable insulating qualities can be achieved. Moreover, on the basis of an equal weight of metal, the present material permits transfer of only 0.16% of the heat flow, on a weight basis.

One of the principal advantages of the present invention is the capability of utilizing the effective thermal insulation material as a structural member. In a typical example, ducting may be formed by welding or otherwise fixing metallic foil members to a mounting flange such that the foil members are spaced from each other and in generally concentric relationship. The foils are welded along their seams to form conduits. The space between the foil tubes is occupied by alternate layers of mesh and foil affixed together and to the foil tubes by welding and the like. The outer surface of the outer foil tube is covered by a layup of mesh and foil, the latter secured to the outer foil tube. Likewise, the inner surface of the inner foil tube is covered by a layup of mesh and foil members, secured to each other and to the inner foil tube. The number of foil and mesh members may vary depending upon the temperature of the fluid in the duct and the reduction in temperature sought. It will be understood that a single foil may be joined to the flange to form the duct, with the remaining components affixed to the foil duct and the flange to form a structural member.

The member just described provides ducting which has a low infrared signature and thus is usable as an exhaust stack for aircraft power plants.

The ability to fashion structural members also permits the thermal insulation of the present invention to be assembled to weapons having a high rate of fire, e.g., gatling guns and high rate of fire weapons in which barrel heat creates a detectable infrared source.

When used at temperatures or in environments and temperatures giving rise to oxidative conditions, one or more of the components may be protected by a thin film of material, such as rhodium, chromium, iridium or platinum, or their alloys by vapor deposition procedures, or other techniques known to the art.

In those instances in which the insulation of this invention is used in an environment of reduced atmospheric pressure, e.g., aerospace, and where the insulation is of stainless steel, tests have indicated significant stability to oxidation. For example, at 0.1 psia, and after 2 hours heating, the weight percent reduction of metal as a function of oxidation was between 3% at 500° F. to about 15% to 2500° F., with an almost linear relationship between the two extremes. At a pressure of 2.5 psi after 2 hours heating, the weight percent reduction of metal was about 4% at 500° F. and about 18% at 2500° F., again with an almost linear relationship between the two extremes. At a pressure of 1.0 psia and for a 2 hour heating period, the weight percent reduction of metal was about 6% at 500° F. and about 23% at 2500° F., with an almost linear relationship between the two extremes.

Other uses of the thermal insulation of this invention also include those installations in which cooling air is circulated in an engine compartment between the engine and the wall forming the outer compartment. In the usual structure, that portion of the compartment adjacent to the cooling air inlet is effectively cooled, but the portions remote therefrom are sometimes not cooled sufficiently to reduce the infrared signature. The thermal insulation of the present invention, due to its efficiency, low weight, lack of bulk and its ability to be formed into structural shapes of complex configuration, readily lends itself to use as a thermal envelope for cooling the compartment. Especially significant in such air installations is the ability to withstand high G loads and vibrational stresses. An incidental benefit is noise reduction because of the acoustic qualities of the material of this invention.

While the thermal insulation of this invention has been described principally with reference to high temperatures, e.g., 500° F. to 4000° F., it also finds use in the cryogenic temperature range. Moreover, the ability to be fabricated into different shapes renders the composites described useful as thermal insulation in the chemical process industry, especially because of the good corrosion resistant qualities of metals and alloys such as stainless steel and the like. In those instances in which weight and bulk are factors, the material of the present invention offers distinct advantages, as do the properties of fabrication into structural shapes and relative ease of installation either as original equipment or as an added modification to already existing structures.

As illustrated in FIG. 34, the sheets of thin metal foil 152 preferably include a plurality of apertures 162. This permits the passage of gas through the apertures 162 in relieving pressure imbalance within the insulation 151 which could deform or rupture the metal foil sheets 152. Also, the outer metal covering 153 preferably includes apertures 163 which permit venting of the insulation 151 so as to relieve pressure imbalance between the interior of the insulation 151 and the exterior environment.

Although described in regard to the embodiment of FIG. 34, it should be understood that in any of the embodiments of the thermal insulation of the invention the metal foil separators may include a plurality of apertures and the metal skin surface or metal covering for the insulation may include a plurality of apertures.

We claim:
1. An all-metal, low-conductivity, high-performance and relatively low-weight composite structure for use as a thermal insulation, said structure comprising:
   metallic member means forming one skin surface for exposure to a zone of one temperature;
   means forming a second skin surface for exposure to a zone of another temperature which is different from said one temperature;
   said metallic member means being spaced from said means forming a second skin surface so as to form a fluid space therebetween;
   metallic means disposed in said fluid space to define a spacer with opposite surface portions of said spacer in adjacent facing relationship with said metallic member means and said means;
   said spacer being formed of a metal mesh having deformations therein to increase the spacing between said metallic member means and said means forming a second skin surface;
   fixing means maintaining said metallic member means, said means and said metallic spacer in fixed relationship to each other;
   the wire mesh of said spacer defining relatively long paths for the conduction of heat between said metallic member means and said means forming a second skin surface;
   said metallic spacer forming multiple void spaces between said metallic member means and said means forming a second skin surface and said void spaces being sufficiently small in size to limit the circulation of gas between said metallic member means and said means forming a second skin surface, and
   said composite structure being essentially free of non-metallic components.

2. The composite as defined in claim 1 wherein said deformations are spaced dimples.

3. The composite as defined in claim 1 wherein said deformations are spaced corrugations.

4. The composite as defined in claim 1 wherein said void spaces are filled with a non-combustible metallic mass of filamentary material.

5. The composite as defined in claim 1 wherein said means forming a second skin surface is a mesh member having deformations therein,
   a portion of said deformations being in contact with said metallic spacer, and
   another portion of said deformations defining said second skin surface.

6. The composite as defined in claim 1 wherein:
   such spacer is dimpled;
   said means forming said second skin surface is dimpled, and also includes a non-dimpled portion, and
   the dimples of said spacer are arranged to overlie the non-dimpled portion of said means forming said second skin surface.

7. The composite as defined in claim 1 wherein said spacer includes at least two metal mesh members.

8. The composite as defined in claim 7 wherein said metallic member means is disposed between said two mesh members.

9. The composite as defined in claim 7 wherein:
   each of said two mesh members includes deformations therein, and
   the deformations of one mesh member are arranged to overlie the non-deformed portions of the other mesh member.

10. The composite as defined in claim 1 wherein said metallic spacer includes alternate layers of foil and mesh means so disposed that the mesh is adjacent to a foil member which forms one outside surface.

11. The composite as defined in claim 1 wherein said metallic spacer includes alternate layers of foil and mesh means so disposed that the foil is adjacent to a mesh member which forms one outside surface.

12. The composite as defined in claim 1 wherein one of said skin surfaces has adjacent thereto a layer of non-flammable filamentary material having a multiplicity of void spaces.

13. The composite as defined in claim 1 wherein:
said metallic member means and the means forming the second skin surface are metallic mesh means, and
said metallic spacer has a mesh size which is different from the mesh size of the metallic member means and the mesh size of the means forming said second skin surface.

14. The composite as defined in claim 1 including means to prevent oxidation thereof.

15. The composite as defined in claim 1 wherein the skin surface exposed to the zone of high temperature is a fluid impermeable metal foil member.

16. The composite as defined in claim 1 wherein said metallic spacer contacts said metallic member means at spaced points to inhibit heat transfer therebetween by conduction.

17. The composite as defined in claim 1 wherein said metallic spacer includes a knitted wire mesh in which the wires are kinked to form a plurality of interconnected loops which loosely connect the wires together.

18. The composite as defined in claim 17 wherein the wires of said knitted wire mesh have a circular configuration.

19. The composite as defined in claim 17 wherein said metallic spacer includes alternate layers of foil and knitted wire mesh.

20. The composite of claim 17 wherein said knitted wire mesh is corrugated.

21. The composite as defined in claim 19 wherein said knitted wire mesh is corrugated.

22. The composite of claim 1 including a structural member with said insulation mounted on said member.

23. A composite as defined in claim 1 wherein said metallic means are tubular members.

24. A composite as defined in claim 23 wherein said tubular members are in the form of tubular mesh members,
said tubular mesh members being disposed such that one portion of outer tubular surface thereof is in facing relation to metallic member means and
the other surface portion thereof defines said means forming a second skin surface.

25. A composite as defined in claim 23 wherein said tubular metallic members constitute at least two alternate layers of individually spaced tubular elements, the tubular elements of each layer being spaced from each other.

26. A composite as defined in claim 23 wherein said tubular members are arranged axially perpendicular to said metallic member means.

27. The composite as defined in claim 8 wherein said metallic member means constitutes means forming a radiation shield.

28. The composite as defined in claim 1 wherein radiation shield means are disposed in said fluid space, and said radiation shield including at least one surface of a low emissivity material.

29. A composite as defined in claim 26 wherein said tubular members are arranged in at least two layers, each tubular member of one layer being so disposed as to be staggered with respect to the tubular members of the adjacent layer, and mesh means interposed between adjacent layers.

30. The combination as defined in claim 22 wherein said structural member is a conduit for high temperature gases, and
said thermal insulation being mounted on the interior of said conduit.

31. The combination as defined in claim 22 wherein said structural member is a conduit for high temperature fluids,
said conduit including means defining a fluid impermeable inner shell and an outer shell, and
said thermal insulation being positioned between said shells.

32. The combination as defined in claim 31 wherein said inner shell is defined by a foil member which forms one skin surface of said thermal insulation.

33. The combination as defined in claim 22 wherein said structural member is a fire wall, and wherein said thermal insulation includes a flame barrier.

34. The combination as defined in claim 22 wherein said structural member is an air-foil member and wherein said thermal insulation is positioned on that portion of the air foil exposed to elevated temperatures.

35. The combination as defined in claim 22 wherein said structural member is an engine exhaust stack, and said thermal insulation being positioned on the outer surface of said exhaust stack for the purpose of reducing the infrared signature of said exhaust stack.

* * * * *